(12) United States Patent
Tanimoto et al.

(10) Patent No.: US 6,989,985 B2
(45) Date of Patent: Jan. 24, 2006

(54) ELECTRONIC APPARATUS HAVING DISPLAY UNIT ROTATABLY CONNECTED TO MAIN UNIT

(75) Inventors: Mitsuyoshi Tanimoto, Sagamihara (JP); Hiroshi Nakamura, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 221 days.

(21) Appl. No.: 10/653,355

(22) Filed: Aug. 28, 2003

(65) Prior Publication Data

US 2004/0105227 A1  Jun. 3, 2004

(30) Foreign Application Priority Data

Aug. 30, 2002 (JP) .............................. 2002-255541

(51) Int. Cl.
*G06F 1/16* (2006.01)
(52) U.S. Cl. ........................ 361/681; 361/683; 16/255
(58) Field of Classification Search ................ 361/680, 361/681, 683; 16/255–258
See application file for complete search history.

(56) References Cited

U.S. PATENT DOCUMENTS

| | | | |
|---|---|---|---|
| 5,219,240 A * | 6/1993 | Kitamura | 403/84 |
| 5,268,817 A | 12/1993 | Miyagawa et al. | |
| 5,873,554 A | 2/1999 | Nobuchi | |
| 6,694,569 B2 * | 2/2004 | Chien et al. | 16/367 |
| 6,775,884 B2 * | 8/2004 | Su-Man | 16/342 |

FOREIGN PATENT DOCUMENTS

JP  11-039058  2/1999

* cited by examiner

*Primary Examiner*—Yean-Hsi Chang
(74) *Attorney, Agent, or Firm*—Finnegan, Henderson, Farabow, Garrett & Dunner, L.L.P.

(57) ABSTRACT

An electronic apparatus has a hinge mechanism, which connects a main unit and a display unit. A first shaft of the hinge mechanism connects the display unit to the main unit such that the display unit is rotatable between a closed position where the display unit overlies the main unit and an open position where the display unit is raised up from the main unit. A second shaft of the hinge mechanism is perpendicular to the first shaft and connects the display unit to the main unit so as to be rotatable in a circumferential direction of the second shaft. The main unit has a braking mechanism, which generates braking force that limits rotation of the display unit between the closed position and the open position. The display unit has an engagement member, which is removaly engaged with the braking mechanism.

18 Claims, 26 Drawing Sheets

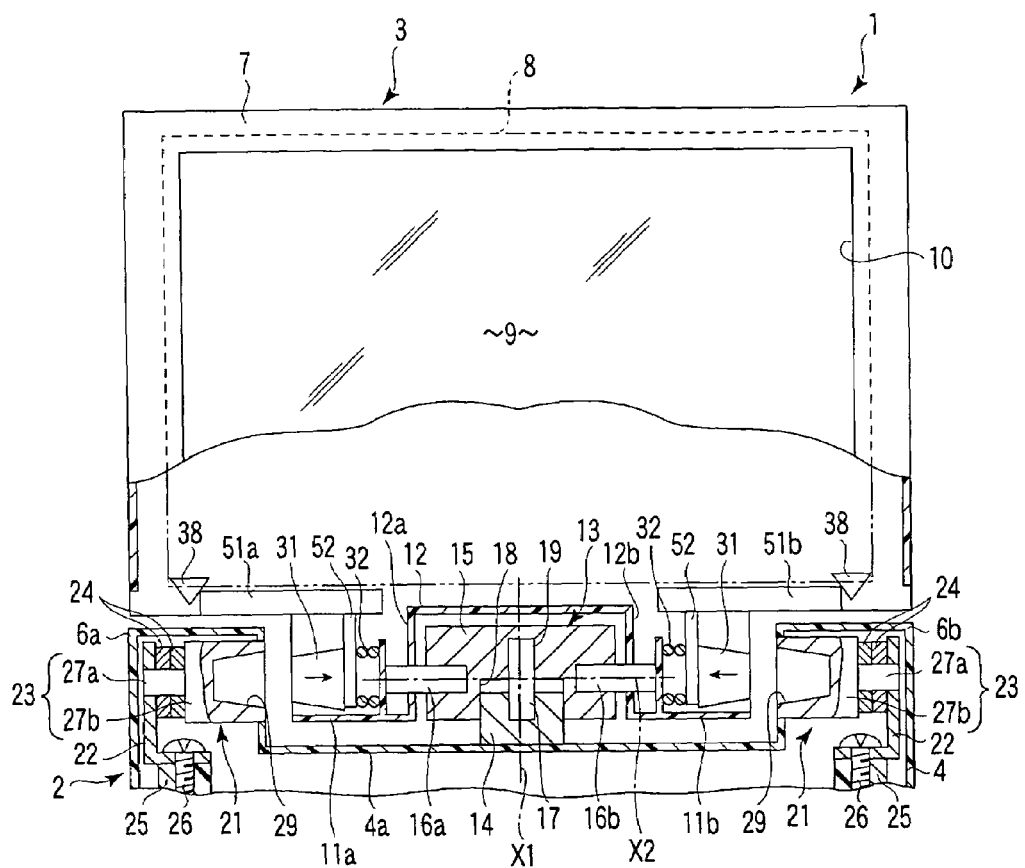
F I G. 10

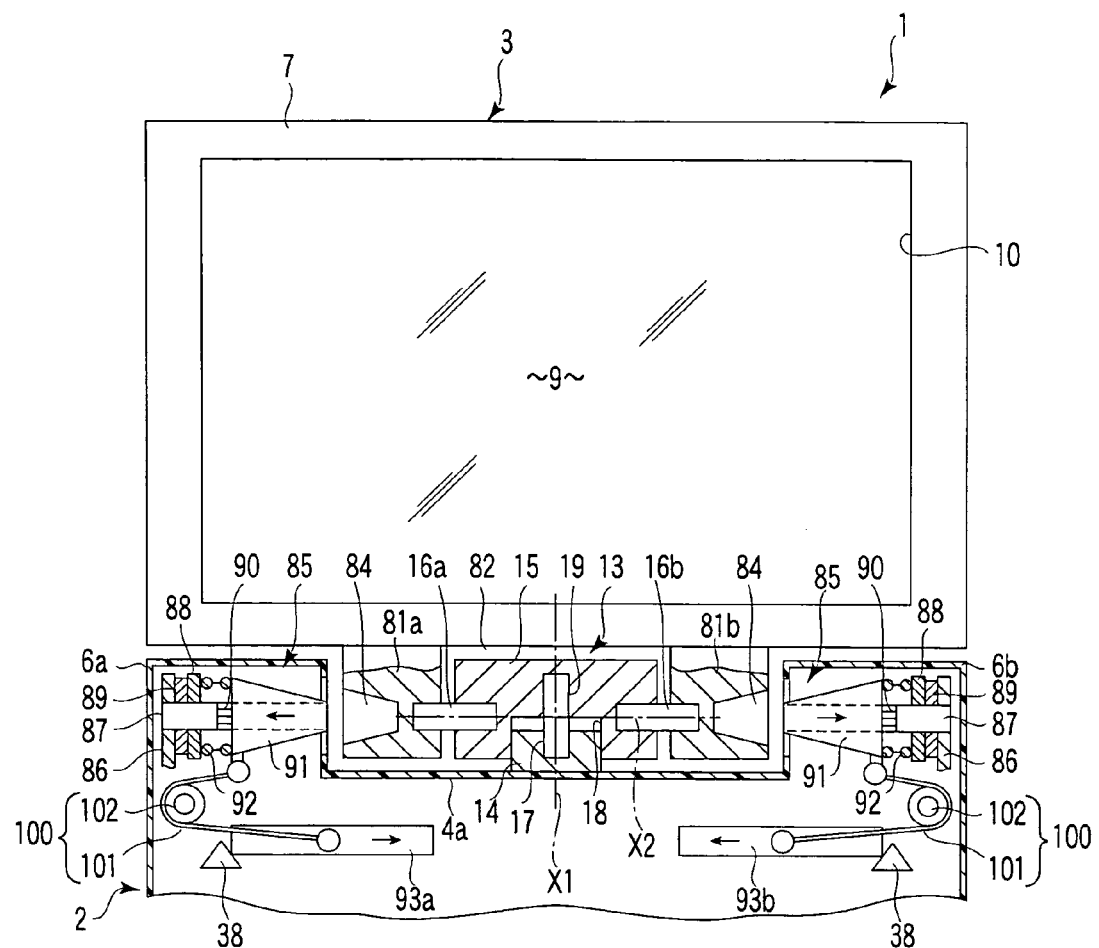
F I G. 16

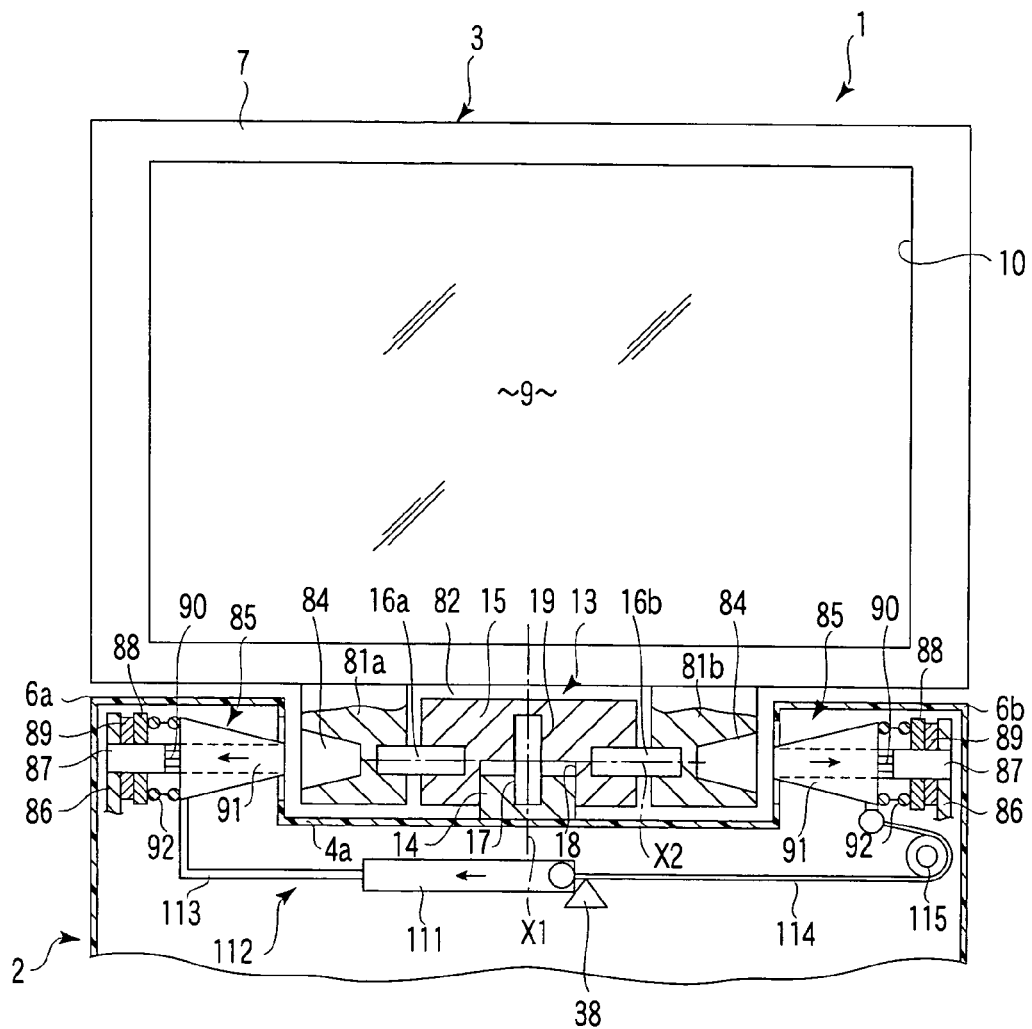
F I G. 18

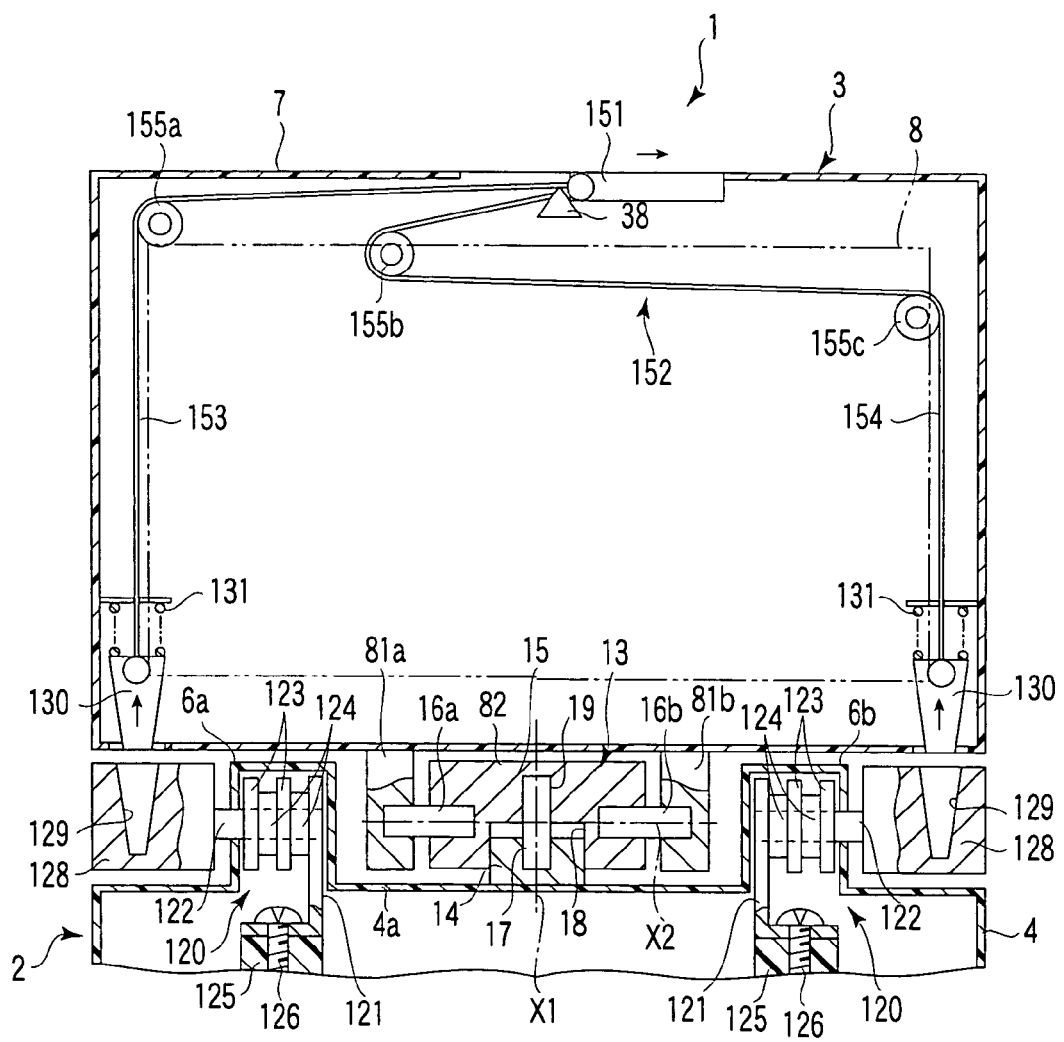
F I G. 24

ELECTRONIC APPARATUS HAVING DISPLAY UNIT ROTATABLY CONNECTED TO MAIN UNIT

CROSS-REFERENCE TO RELATED APPLICATIONS

This application is based upon and claims the benefit of priority from the prior Japanese Patent Application No. 2002-255541, filed Aug. 30, 2002, the entire contents of which are incorporated herein by reference.

BACKGROUND OF THE INVENTION

1. Field of the Invention

The present invention relates to an electronic apparatus, such as a portable computer having a 180° rotatable display unit, and more specifically to a structure connecting the display unit to a main unit.

2. Description of the Related Art

For example, Japanese Patent Application KOKAI Publication No. 11-39058 discloses a notebook-type portable computer having a 180° rotatable display unit. The portable computer has a hinge mechanism connecting the display unit to a main unit. The hinge mechanism has a horizontal first shaft extending in the width direction of the main unit, and a vertical second shaft perpendicular to the first shaft.

The first shaft of the hinge mechanism connects the display unit to the main unit such that the display unit is rotatable between a closed position, where the display unit overlies the main unit, and an open position, where the display unit is raised up from the main unit. The second shaft of the hinge mechanism connects the display unit to the main unit such that the display unit is 180° rotatable in the circumferential direction of the second shaft.

With the above structure, the display unit can be rotated 180° about the second shaft in the state where the display unit is in the open position. As a result, the screen located on the front surface of the display unit is turned to the back of the main unit. Therefore, the screen can be observed from behind the main unit. When the display unit is rotated from the open position to the closed position in the state where the screen is directed to the back of the main unit, the display unit lies on the main unit and the screen is horizontal. In this state, the screen can be used as an input surface, so that various operation can be input by touching the input surface with a finger or a pen.

The hinge mechanism is located at a center along the width direction of the portable computer. With this structure, the main unit and the display unit are coupled at a single portion. Therefore, the torque that is produced when the display unit is rotated between the closed position and the open position and the torque that is produced when the display unit is 180° rotated about the second shaft are liable to concentrate at the centers of the main unit and the display unit.

In the portable computer, to maintain the display unit at an arbitrary open angle, braking force which limits free rotation of the display unit is exerted on the hinge mechanism. Therefore, when the display unit is rotated from the closed position to the open position and vice versa, high torque that can overcome the braking force is required. Accordingly, great stress is inevitably exerted on the connecting portion between the main unit and the display unit and the hinge mechanism. Therefore, high rigidity of the connecting portion and the hinge mechanism is required, and the size of the connecting portion and the hinge mechanism may be increased for this purpose.

As to recent portable computers, there is a demand for a thin and small main unit and display unit for convenience of portability. For this reason, since the connecting portion between the main unit and the display unit and the hinge mechanism cannot be excessively large-sized, sufficient rigidness of the connecting portion and the hinge mechanism cannot be maintained. Therefore, the display unit wobbles when it is rotated, resulting in low operability.

BRIEF SUMMARY OF THE INVENTION

According to an embodiment of the present invention, an electronic apparatus comprises: a main unit; a display unit distinct from the main unit; a hinge mechanism having first and second shafts, the first shaft connecting the display unit to the main unit such that the display unit is rotatable between a closed position where the display unit overlies the main unit and an open position where the display unit is raised up from the main unit, and the second shaft extending in a direction perpendicular to the first shaft and connecting the display unit to the main unit so as to be rotatable in a circumferential direction of the second shaft; a braking mechanism, which is mounted in the main unit and generates braking force that limits rotation of the display unit between the closed position and the open position; and an engagement member, which is mounted in the display unit and movable between an engagement position where it is engaged with the braking mechanism and an engagement release position where it is removed from the braking mechanism.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 10 is a cross-sectional view of the portable computer according to the third embodiment, which shows a state in which the engaging members are in an engagement release position to release the connection between the display unit and the braking mechanism.

FIG. 16 is a cross-sectional view of the portable computer according to the sixth embodiment, which shows a state in which the engaging members are in an engagement release position to release the connection between the display unit and the braking mechanism.

FIG. 18 is a cross-sectional view of the portable computer according to the seventh embodiment, which shows a state in which the engaging members are in an engagement release position to release the connection between the display unit and the braking mechanism.

FIG. 24 is a cross-sectional view of the portable computer according to the tenth embodiment, which shows a state in which the engaging members are in an engagement release position to release the connection between the display unit and the braking mechanism.

DETAILED DESCRIPTION OF THE INVENTION

Figure 1:
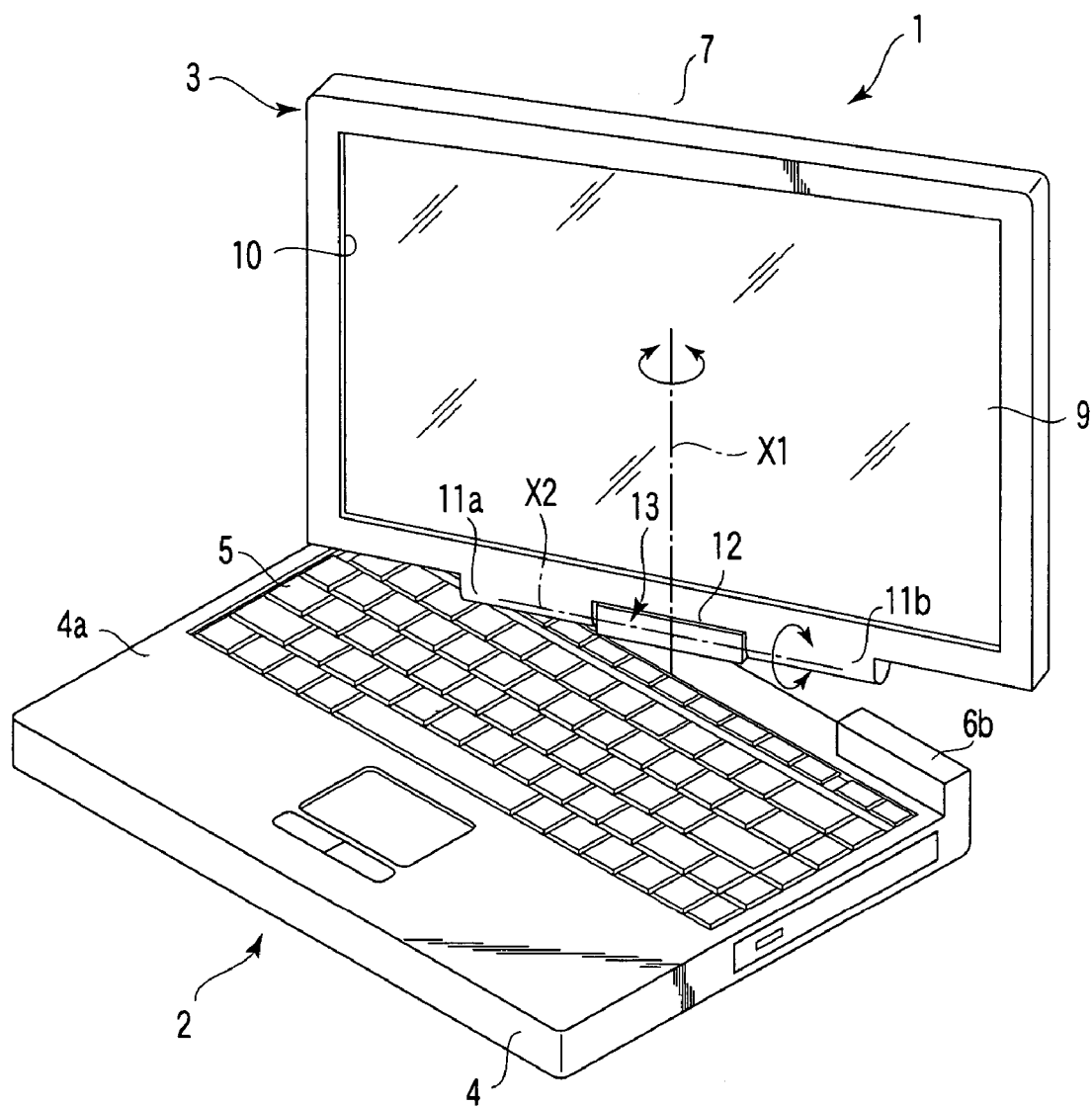
FIG. 1 is a perspective view of a portable computer according to a first embodiment of the present invention, which shows a state in which a display unit is in an open position.

A first embodiment of the present invention will be described with reference to FIGS. 1 to 6.

FIGS. 1 to 4 show a portable computer 1 as an electronic apparatus. The portable computer 1 has a main unit 2 and a display unit 3, which is independent of the main unit 2. The main unit 2 has a flat box-shaped housing 4. The housing 4 houses a printed circuit board, on which a microprocessor or the like is mounted, a hard disk drive, a CD-ROM driver, etc.

The housing 4 has an upper surface 4*a,* on which a keyboard 5 is arranged. A pair of hollow projections 6*a* and 6*b* are formed on a back end portion of the upper surface 4*a*. The hollow projections 6*a* and 6*b* are separated from each other in the width direction of the housing 4, and projected upward from the upper surface 4*a* of the housing 4.

The display unit 3 has a flat box-shaped display housing 7 and a liquid crystal display panel 8 housed in the display housing 7. The liquid crystal display panel 8 has a screen, which displays information. The screen is covered with a transparent touch panel 9. Information is input to the portable computer 1 through a touch to the touch panel 9 with a pen or a fingertip. The touch panel 9 is exposed to the outside of the display unit 3 through an opening 10 formed on a front surface of the display housing 7.

The display housing 7 has a pair of hollow leg portions 11a and 11b and a hinge holding portion 12. The hollow leg portions 11a and 11b are separated from each other in the width direction of the display housing 7. The hollow leg portions 11a and 11b are projected from a side of the display housing 7 and between the hollow projections 6a and 6b of the housing 4. The hinge holding portion 12 is located between the hollow leg portions 11a and 11b. The hinge holding portion 12 has left and right side walls 12a and 12b. The side walls 12a and 12b face each other in the width direction of the display housing 7.

Figure 4:
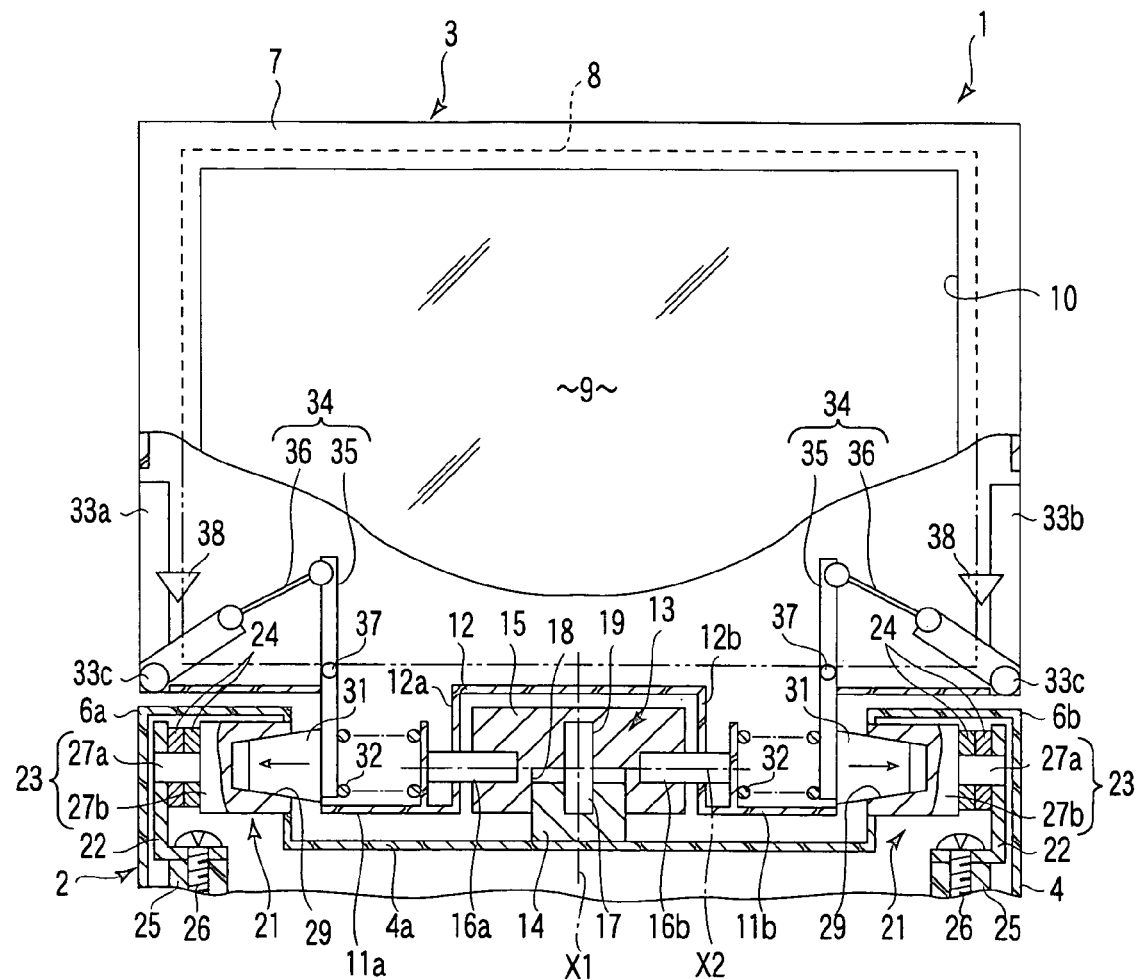
FIG. 4 is a cross-sectional view of the portable computer according to the first embodiment, which shows a state in which engaging members are in an engagement position to connect the display unit and a braking mechanism.

The main unit 2 and the display unit 3 are connected to each other by a hinge mechanism 13 made of metal. As shown in FIG. 4, the hinge mechanism 13 has a columnar base 14, a support bracket 15, a pair of first shafts 16a and 16b and a second shaft 17.

The base 14 is fixed to the upper surface 4a of the housing 4. The base 14 is located at the center of the space between the hollow projections 6a and 6b of the housing 4, and projects upward from the upper surface 4a of the housing 4. The second shaft 17 is coaxially supported to the center of the base 14. The second shaft 17 projects upward from the top end surface of the base 14. The base 14 and the second shaft 17 stand upright along a vertical line X1 in the thickness direction of the housing 4.

The support bracket 15 is inserted in the hinge holding portion 12 of the display unit 3. The support bracket 15 has a recess portion 18 and a shaft receiving hole 19. The recess portion 18 is formed in a central portion of the lower surface of the support bracket 15 so as to face the base 14. The shaft receiving hole 19 is opened in the end face of the recess portion 18 and arranged coaxially with the recess portion 18. The base 14 is rotatably fitted in the recess portion 18. The second shaft 17 projecting from the base 14 is rotatably fitted in the shaft receiving hole 19.

With the above structure, the support bracket 15 is supported by the housing 14 so as to be rotatable in the circumferential direction of the base 14 and the second shaft 17. In addition, friction resistance is generated in the fitting portion between the base 14 and the recess portion 18 and the fitting portion between the second shaft 17 and the shaft receiving hole 19. The friction resistance limits free rotation of the support bracket 15 in the circumferential direction of the second shaft 17.

The first shafts 16a and 16b are fixed to the left and right end portions of the support bracket 15. The first shafts 16a and 16b are coaxial with each other and arranged along a horizontal line X2 extending in the width direction of the housing 4. As a result, the first shafts 16a and 16b and the second shaft 17a are kept perpendicular to each other.

The first shafts 16a and 16b are inserted through the left and side walls 12a and 12b of the hinge holding portion 12. As a result, the display housing 7 is rotatably supported by the support bracket 15 via the first shafts 16a and 16b. In addition, friction resistance is generated in the contact portion in which the first shafts 16a and 16b are in contact with the side walls 12a and 12b. The friction resistance limits free rotation of the display housing 7 in the circumferential direction of the first shafts 16a and 16b.

Figure 2:
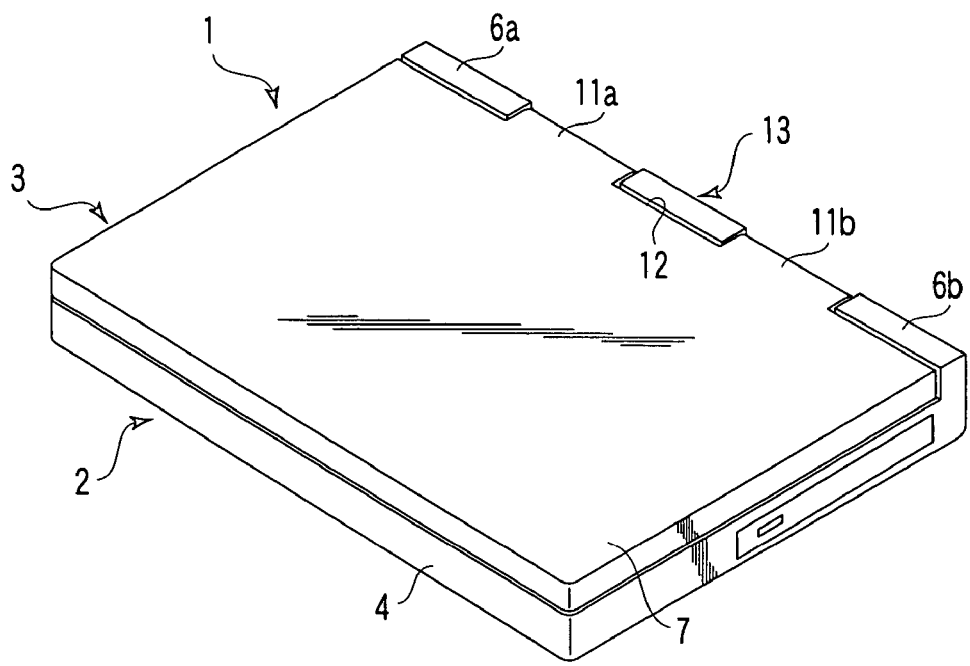
FIG. 2 is a perspective view of the portable computer according to the first embodiment of the present invention, which shows a state in which the display unit is in a closed position.

With the above structure, the first shafts 16a and 16b of the hinge mechanism 13 support the display unit 3 to the main unit 2 so as to be rotatable between the closed position and the open position. In the closed position, the display unit 3 overlies the main unit 2 as shown in FIG. 2, and covers the upper surface 4a of the main unit 2 and the keyboard 5 from above. In the open position, as shown in FIG. 1, the display unit 3 is raised from the main unit 2, and the keyboard 5 and the touch panel 9 are exposed to the outside of the portable computer 1.

The second shaft 17 of the hinge mechanism 13 supports the display unit 3 to the main unit 2 so as to rotatable 180° between a first reverse position and a second reverse position. This rotation of the display unit 3 is performed in the state where the display unit 3 is in the open position. In the first reverse position, as shown in FIG. 1, the touch panel 9 is directed forward with respect to the portable computer 1 and faces the operator who operates the keyboard 5. In the second reverse position, the touch panel 9 is directed backward with respect to the portable computer 1, and the back surface of the display housing 7 faces the operator.

Figure 6:
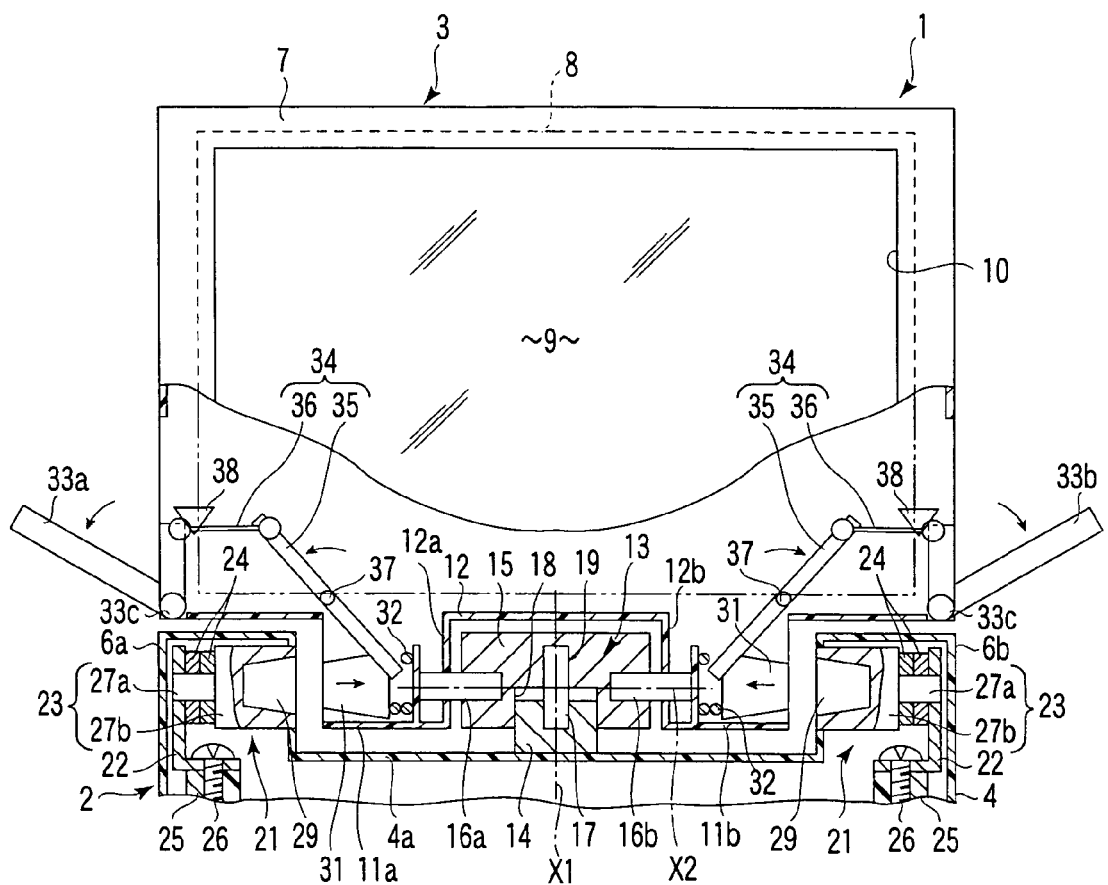
FIG. 6 is a cross-sectional view of the portable computer according to the first embodiment, which shows a state in which the engaging members are in an engagement release position to release the connection between the display unit and the braking mechanism.

As shown in FIGS. 4 and 6, the housing 4 contains a pair of braking mechanisms 21. The braking mechanisms 21 are located inside the hollow projections 6a and 6b of the housing 4, and separated from each other in the width direction of the housing 4. Each of the braking mechanisms 21 has a bracket 22, a brake shaft 23 and a plurality of spring washers 24.

Figure 5A:
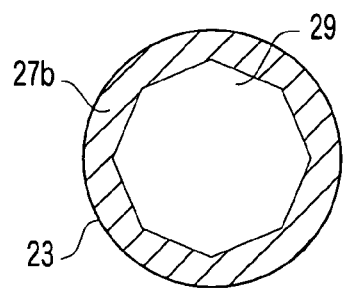
FIG. 5A is a cross-sectional view showing the shape of an opening of a recess of a brake shaft.

The bracket 22 is fixed to a boss portion 25 of the housing 4 with a screw 26. The brake shaft 23 is arranged horizontally along the width direction of the housing 4, and coaxial with the first shafts 16a and 16b of the hinge mechanism 13. The brake shaft 23 has a small diameter portion 27a and a large diameter portion 27b. The small diameter portion 27a is supported by an end portion of the bracket 22 so as to be rotatable in the circumferential direction of the shaft. The large diameter portion 27b has a recess 29, which is opened in the end face opposite to the small diameter portion 27a. As shown in FIG. 5A, the recess 29 has an opening shaped as, for example, a regular octagon. The inner diameter of the recess 29 gradually reduces from the opening edge toward the innermost end of the recess 29. The opening edge of the recess 29 is exposed to the space between the hollow projections 6a and 6b, and faces the hollow leg portion 11a or 11b of the display housing 7.

The spring washers 24 are sandwiched between the bracket 22 and the large diameter portion 27b. The spring washers 24 are slidably pressed against the large diameter portion 27. Therefore, friction force is generated in a contact portion between the large diameter portion 27 and the spring washer 24. The friction force functions as braking force which restrains the brake shaft 23 from freely rotating in the circumferential direction of the shaft.

Figure 5B:
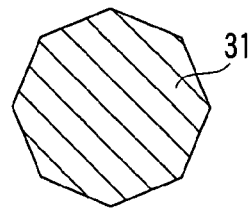
FIG. 5B is a cross-sectional view of the engaging member.

Each of the hollow leg portions 11a and 11b of the display unit 3 contains an engaging member 31. As shown in FIG. 5B, the engaging member 31 has a cross section of a regular octagon. The outer diameter of the engaging member 31 gradually reduces from one end toward the other end. The engaging member 31 is arranged coaxially with the brake shaft 23 and the first shafts 16a and 16b of the hinge mechanism 13.

The engaging member 31 is supported by the display housing 7 so as to be movable between an engagement position and an engagement release position. The engaging member 31 is horizontally movable along the width direction of the housing 4. FIG. 4 shows a state in which the engaging members 31 are in the engagement position. In the engagement position, the engaging members 31 project from the hollow leg portions 11a and 11b, and engage with the recesses 29 of the brake shafts 23. As a result, the engaging members 31 are fitted in the recesses 29, so that they are integrally connected. FIG. 6 shows a state in which the engaging members 31 are in the engagement release position. In the engagement release position, the engaging members 31 are removed from the recesses 29, and retracted within the hollow leg portions 11*a* and 11*b*. The engaging members 31 are always forced elastically toward the engagement position by coil springs 32.

The display unit 3 has a pair of operation levers 33*a* and 33*b* as operation members. The operation levers 33*a* and 33*b* serve to move the engaging members 31 to the engagement position or the engagement release position. The operation levers 33*a* and 33*b* are rotatably supported to left and right side portions of the display housing 7 with pivot shafts 33*c*.

The operation levers 33*a* and 33*b* are individually operated in conjunction with the engaging members 31 via cooperation mechanisms 34. The cooperation mechanisms 34 are interposed in a gap between the back surface of the display housing 7 and the liquid crystal display panel 8. Each of the conjunction mechanisms 34 has a cooperation rods 35 and a cooperation wire 36. The cooperation rod 35 is supported, in an intermediate portion thereof, by the display housing 7 with a pivot shaft 37. First ends of the cooperation rods 35 are connected to the engaging members 31. Second ends of the cooperation rods 35 are connected to the operation levers 33*a* and 33*b* through the cooperation wires 36. Therefore, the operation levers 33*a* and 33*b* are rotatable between a first operation position to move the engaging members 31 to the engagement position and a second operation position to move the engaging members 31 to the engagement release position. The operation levers 33*a* and 33*b* are manually operated by an operator.

FIG. 4 shows a state in which the operation levers 33*a* and 33*b* are in the first operation position. In the first operation position, the operation levers 33*a* and 33*b* stand along the left and right sides of the display housing 7. In addition, the cooperation rods 35 of the cooperation mechanisms 34 stand at right angles with the first shafts 16*a* and 16*b*.

FIG. 6 shows a state in which the operation levers 33*a* and 33*b* are in the second operation position. In the second operation position, the operation levers 33*a* and 33*b* are protruded out of the left and right sides of the display housing 7. When the operation levers 33*a* and 33*b* are rotated, the cooperation wires 36 are pulled and the operation rods 35 are rotated in a direction, by which the engaging members 31 are drawn out of the recesses 29. As a result, the engaging members 31 are retracted inside the hollow leg portions 11*a* and 11*b* of the display unit 3 against the urging force of the coil springs 32.

As shown in FIGS. 4 and 6, the display housing 7 houses lock members 38. The lock members 38 removably hang on the operation levers 33*a* and 33*b,* when the operation levers 33*a* and 33*b* are rotated from the first operation position to the second operation position. As a result, the operation levers 33*a* and 33*b* are held in the second operation position. Therefore, even when the operator takes hands off the operation levers 33*a* and 33*b,* the engaging members 31 are kept in the engagement release position.

An operation of the portable computer 1 constructed as described above will now be explained.

As long as the operation levers 33*a* and 33*b* are in the first operation position shown in FIG. 4, the engaging members 31 are kept in the engagement position by the coil springs 32. Therefore, the engaging members 31 are fitted in the recesses 29 of the brake shafts 23. Owing to this engagement, the engaging members 31 are coupled with the brake shafts 23 so as to be integrally rotatable.

When the display unit 3 is rotated from the closed position to the open position, the movement of the display unit 3 is transmitted to the brake shafts 23 via the engagings members 31. Therefore, the torque, generated when the display unit 3 is rotated from the closed position to the open position or vice versa, is distributed between the hinge mechanism 13 and the braking mechanisms 21.

Further, as long as the engaging members 31 are in the engagement position, they are coupled with the brake shafts 23. Therefore, the display unit 3 is prevented from rotating in the circumferential direction of the second shaft 17. The display unit 3 is rotatable only between the closed position and the open position. Consequently, when the display unit 3 is rotated from the closed position to the open position or vice versa, it never rotates in the circumferential direction of the second shaft 17.

When the operation levers 33*a* and 33*b* of the display unit 3 are rotated from the first operation position to the second operation position, the engaging members 31 are drawn out of the recesses 29 of the brake shafts 23 against the urging force of the coil springs 32. As a result, the coupling between the display unit 3 and the brake shafts 23 is released. Therefore, the display unit 3 can be rotated 180° between the first reverse position and the second reverse position.

Figure 3:
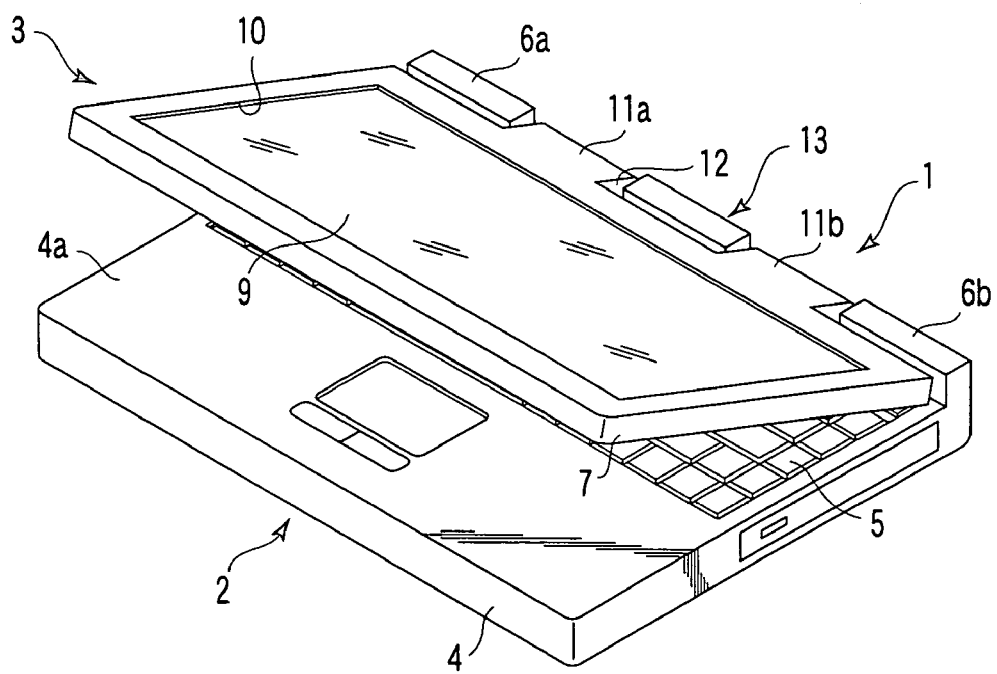
FIG. 3 is a perspective view of the portable computer according to the first embodiment, which shows a state in which the display unit is 180° rotated.

If the display unit 3 is rotated from the open position to the closed position when the display unit 3 is in the second reverse position, the display unit 3 overlies the housing 4 with the touch panel 9 directed upward, as shown in FIG. 3. In this state, information can be input to the portable computer 1 through a touch to the touch panel 9 with a pen or a fingertip.

With the portable computer 1, when the display unit 3 is rotated between the closed position and the open position, the torque exerted on the connecting portion between the display unit 3 and the braking mechanism 21 is distributed to the brake shafts 23 of the braking mechanisms 21. Therefore, the load on the hinge mechanism 13 can be reduced. In addition, the load on the connecting portion between the hinge mechanism 13 and the main unit 2 and the connecting portion between the hinge mechanism 13 and the display unit 3 can be reduced. Therefore, the hinge mechanism 13 can be small-sized, and the connecting portion between the hinge mechanism 13 and the main unit 2 and the connecting portion between the hinge mechanism 13 and the display unit 3 can also be small-sized.

Further, in the state where the engaging members 31 are coupled with the brake shafts 23, the display unit 3 is supported by three positions: the hinge mechanism 13 and the pair of braking mechanisms 21. Therefore, when the display unit 3 is rotated, the wobble or shake of the unit can be suppressed, so that the rotation can be smooth.

According to the first embodiment described above, the brake shafts 23 are fixed to the housing 4, while the engaging members 31 are rotated, following the display unit 3. Therefore, the relative positional relationship between the recess 29 of each brake shaft 23 and the engaging member 31 varies according to the rotation angle of the display unit 3. For this reason, the cross section of the recess 29 and the engaging member 31 along the radial direction should preferably a polygon, approximate to a circle as far as possible. With this feature, in particular, when the engaging members 31 are inserted in the recesses 29, it is unnecessary to change the rotation angle of the display unit 3. Therefore, the work of inserting the engaging members 31 into the recesses 29 can be eased.

Figure 7:
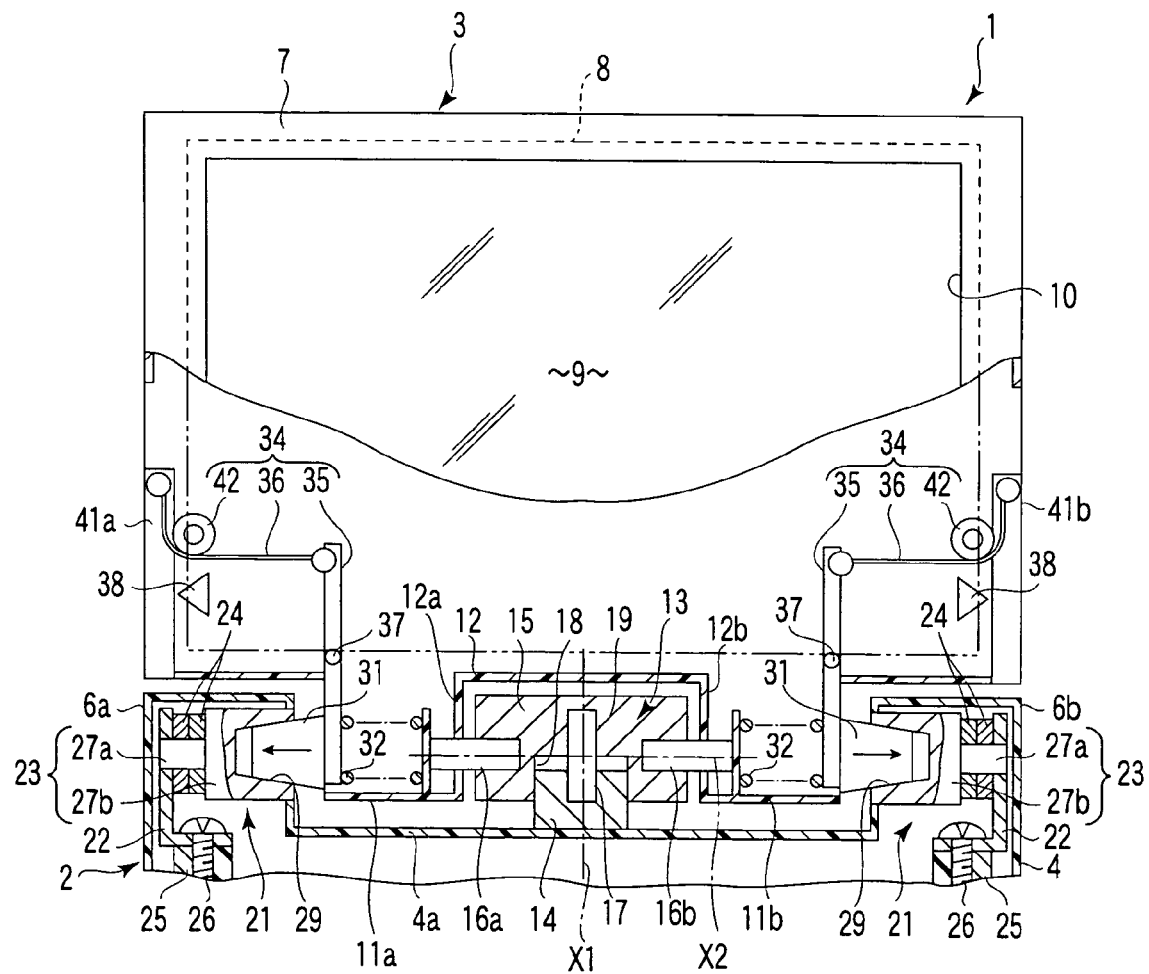
FIG. 7 is a cross-sectional view of the portable computer according to a second embodiment of the present invention, which shows a state in which engaging members are in an engagement position to connect a display unit and a braking mechanism.
Figure 8:
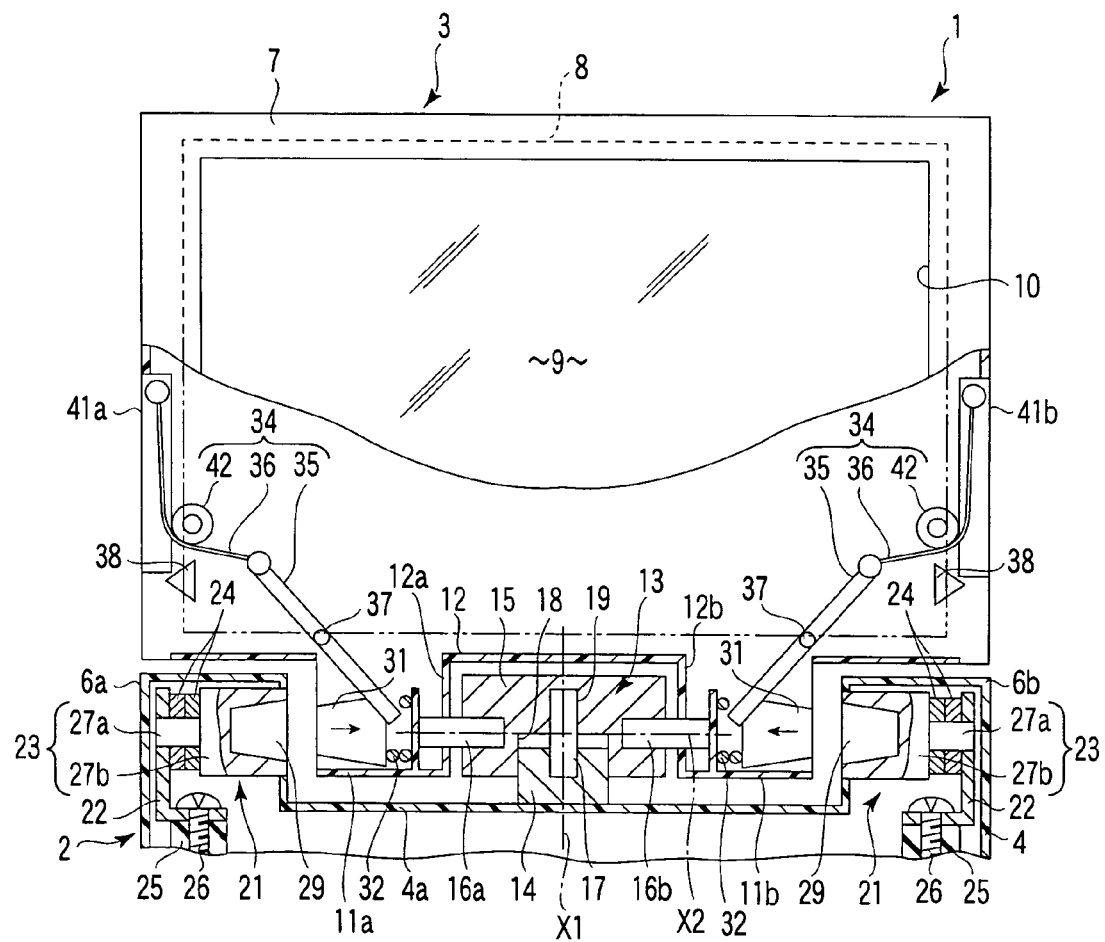
FIG. 8 is a cross-sectional view of the portable computer according to the second embodiment, which shows a state in which the engaging members are in an engagement release position to release the connection between the display unit and the braking mechanism.

The present invention is not limited to the first embodiment described above. FIGS. 7 and 8 show a second embodiment of the present invention. The second embodiment is different from the first embodiment in structure for moving the engaging members 31 to the engagement position or the engagement release position. The other basic structure of the portable computer 1 is the same as that of the first embodiment. Therefore, in the description of the second embodiment, the structural elements the same as those of the first embodiment are identified by the same reference numerals as used for the first embodiment, and the description thereof is omitted.

As shown in FIGS. 7 and 8, the display unit 3 has a pair of operation levers 41a and 41b as operation members. The operation levers 41a and 41b are arranged on left and right side end portions of the display housing 7. The operation levers 41a and 41b are slidably supported to the display housing 7, so as to be slidable between a first operation position to move the engaging members 31 to the engagement position and a second operation position to move the engaging members 31 to the engagement release position.

The cooperation mechanisms 34 for cooperating the operation levers 41a and 41b to the engagement members 31 respectively have pulleys 42. Each of the pulley 42 is supported to the display housing 7 and interposed between the second end of the operation lever 41a or 41b and the cooperation rod 35. The cooperation wires 36 are put on the pulleys 42. Thus, the cooperation wires 36 are guided substantially horizontally from the second ends of the cooperation rods 35 to the left and right sides of the display housing 7, and then extended upward to the upper ends of the operation levers 41a and 41b.

FIG. 7 shows a state in which the operation levers 41a and 41b are in the first operation position. In the first operation position, the operation levers 41a and 41b are pushed down to the lowermost end of the display housing 7. In addition, the engaging members 31 are fitted in the recesses 29 of the brake shafts 23. FIG. 8 shows a state in which the operation levers 41a and 41b are slid from the first operation position to the second operation position. In the second operation position, the cooperation wires 36 are pulled upward, and the second ends of the cooperation rods 35 connected to the cooperation wires 36 are pulled to the left and right sides of the display housing 7. As a result, the cooperation rods 35 are rotated and draw the engaging members 31 out of the recesses 29. Consequently, the coupling between the engaging members 31 and the brake shafts 23 is released, so that the display unit 3 can be rotated about the second shaft 17.

Figure 9:
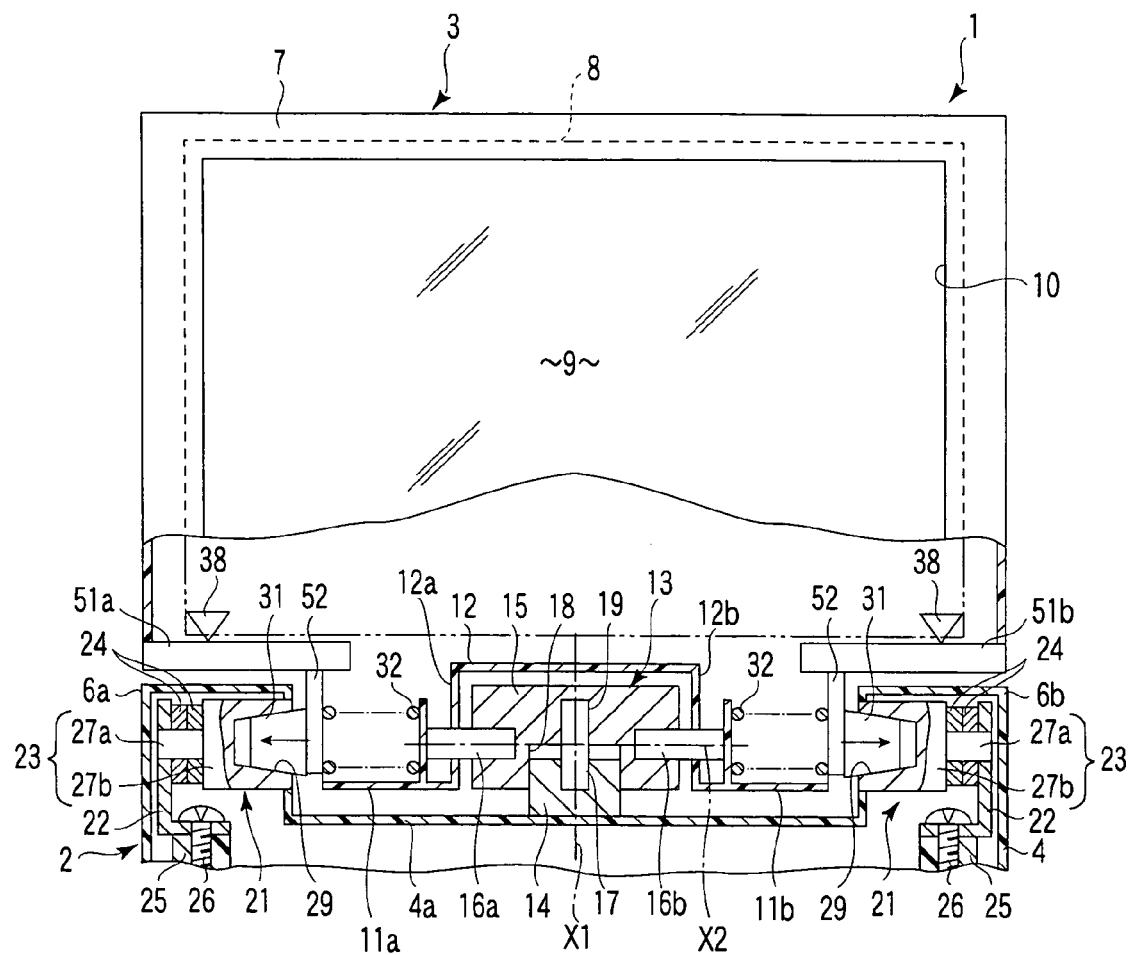
FIG. 9 is a cross-sectional view of the portable computer according to a third embodiment of the present invention, which shows a state in which engaging members are in an engagement position to connect a display unit and a braking mechanism.

FIGS. 9 and 10 show a third embodiment of the present invention.

The third embodiment is different from the first embodiment in structure for moving the engaging members 31 to the engagement position or the engagement release position. The other basic structure of the portable computer 1 is the same as that of the first embodiment.

As shown in FIGS. 9 and 10, the display unit 3 has a pair of operation levers 51a and 51b as operation members. The operation levers 51a and 51b are arranged to left and right of the lowermost portion of the display housing 7. The operation levers 51a and 51b are slidable in the width direction of the display housing 7 between a first operation position to move the engaging members 31 to the engagement position and a second operation position to move the engaging members 31 to the engagement release position.

The operation levers 51a and 51b respectively have cooperation rods 52. The cooperation rods 52 extend to the insides of the hollow leg portions 11a and 11b and connect with the engaging members 31.

FIG. 9 shows a state in which the operation levers 51a and 51b are in the first operation position. In the first operation position, the engaging members 31 are moved to the brake shafts 23 by the cooperation rods 52 of the operation levers 51a and 51b. As a result, the engaging members 31 are fitted in the recesses 29 of the brake shafts 23.

FIG. 10 shows a state in which the operation levers 51a and 51b are in the second operation position. In the second operation position, the engaging members 31 are moved by the cooperation rods 52 of the operation levers 51a and 51b away from the recesses 29. As a result, the coupling between the engaging members 31 and the brake shafts 23 is released.

With the above structure, the operation levers 51a and 51b are directly connected to the engaging members 31. Therefore, it is unnecessary to arrange a mechanism to connect the operation levers 51a and 51b with the engaging members 31 in the display housing 7. Accordingly, the structure for moving the operation levers 51a and 51b can be simple, so that the cost can be reduced.

Further, since the direction in which the operation levers 51a and 51b slide coincides with the direction of movement of the engaging members 31, the movement of the operation levers 51a and 51b are directly transmitted to the engaging members 31. Therefore, the operability of the operation levers 51a and 51b increases, and the engaging members 31 can be reliably moved to the engagement position or the engagement release position.

Figure 11:
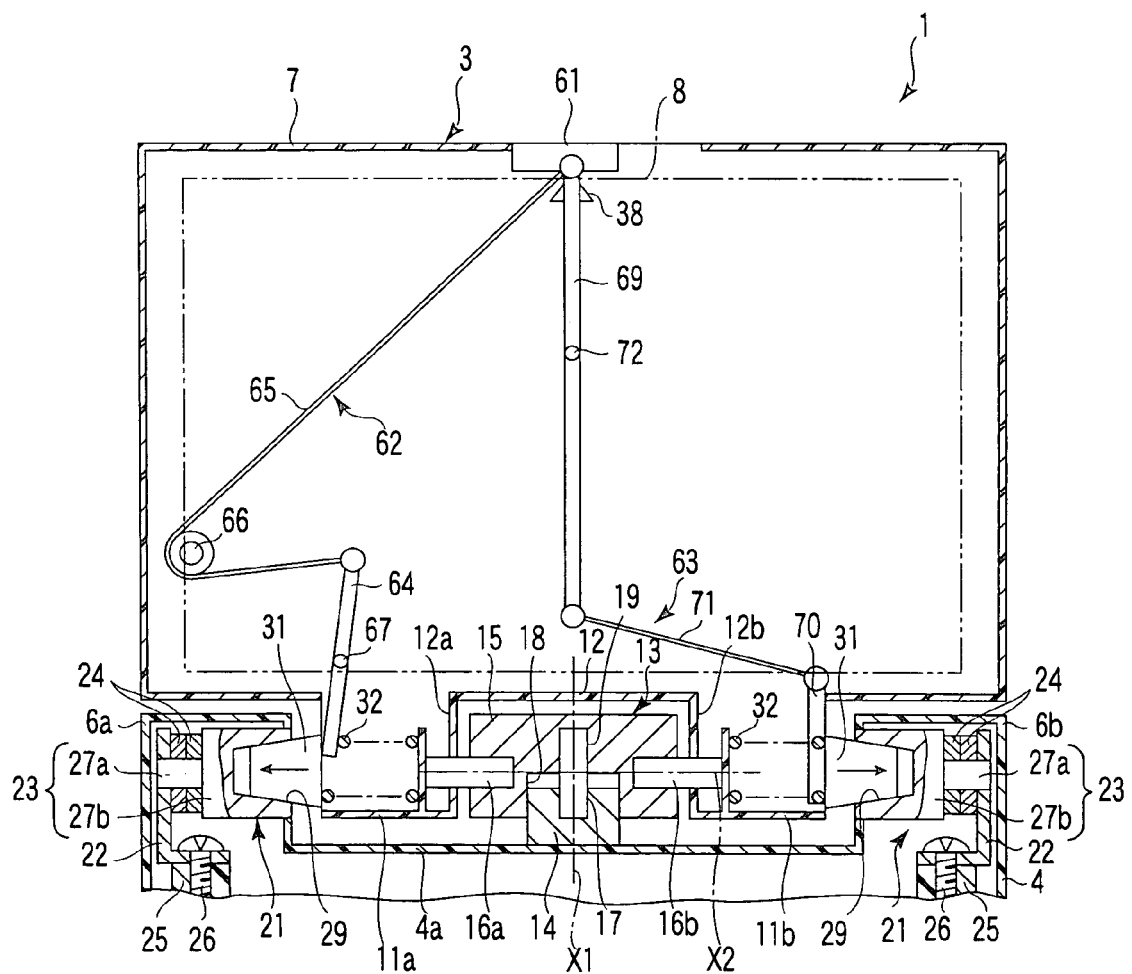
FIG. 11 is a cross-sectional view of the portable computer according to a fourth embodiment of the present invention, which shows a state in which engaging members are in an engagement position to connect a display unit and a braking mechanism.
Figure 12:
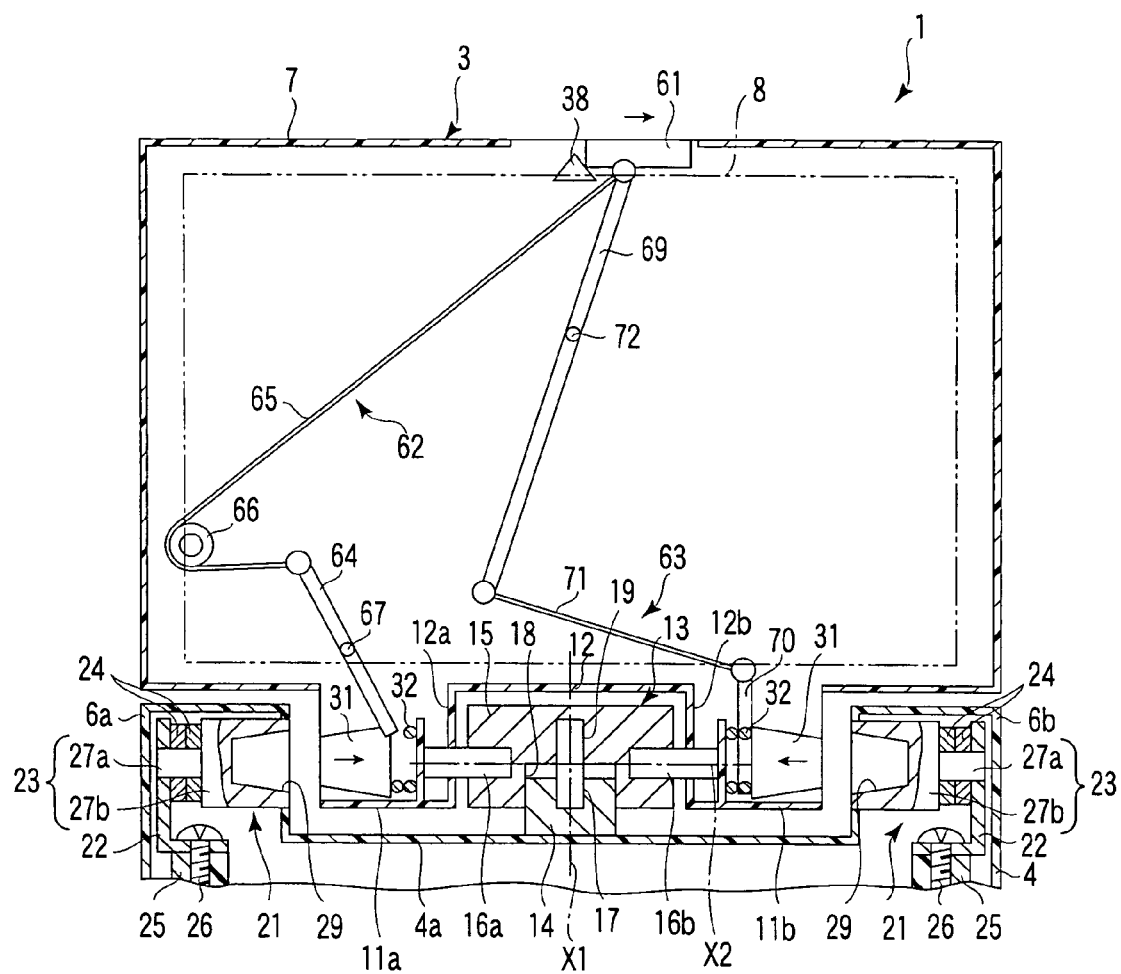
FIG. 12 is a cross-sectional view of the portable computer according to the fourth embodiment, which shows a state in which the engaging members are in an engagement release position to release the connection between the display unit and the braking mechanism.

FIGS. 11 and 12 show a fourth embodiment of the present invention.

The fourth embodiment is different from the first embodiment in structure for moving the engaging members 31 to the engagement position or the engagement release position. The other basic structure of the portable computer 1 is the same as that of the first embodiment.

As shown in FIGS. 11 and 12, the display unit 3 has an operation lever 61 as an operation member. The operation lever 61 is arranged in a central portion of the upper end of the display housing 7. In other words, the operation lever 61 is located on the opposite side of the liquid crystal display panel 8 from the hollow leg portions 11a and 11b of the display housing 7. The operation lever 61 is slidable in the width direction of the display housing 7 between a first operation position to move the engaging members 31 to the engagement position and a second operation position to move the engaging members 31 to the engagement release position.

The operation lever 61 is operated in conjunction with one of the engaging members 31 via a first cooperation mechanism 62. It is also operated in conjunction with the other engagement member 31 via a second cooperation mechanism 63. The first and second cooperation mechanisms 62 and 63 are interposed in a gap between the back surface of the display housing 7 and the liquid crystal display panel 8.

The first cooperation mechanism 62 has a first cooperation rod 64, a first cooperation wire 65 and a pulley 66. The first cooperation rod 64 is supported, in an intermediate portion thereof, by the display housing 7 with a pivot shaft 67. A first end of the first cooperation rod 64 is connected to one of the engaging members 31. A second end of the first cooperation rod 64 is connected to the operation lever 61 through the first cooperation wire 65. The pulley 66 is supported by the display housing 7. The pulley 66 is shifted from the second end of the first cooperation rod 64 toward the left side of the display housing 7. The first cooperation wire 65 is put on the pulley 66. The first cooperation wire 65 is guided substantially horizontally from the second end of the first cooperation rod 64 to the left side of the display housing 7, and then extended to the operation lever 61.

The second cooperation mechanism 63 has a second cooperation rod 69, a third cooperation rod 70 and a second cooperation wire 71. The second rod 69 extends in the height direction of the display housing 7 in a central portion along the width direction of the display housing 7. The second cooperation rod 69 is supported, in an intermediate portion thereof, by the display housing 7 with a pivot shaft 72. A first end of the second cooperation rod 69 is connected to the operation lever 61. A second end of the second cooperation rod 69 is shifted from the other engaging member 31 toward the center of the display housing 7 along the width direction of the housing 7. The third cooperation rod 70 is connected to the other engaging member 31, and the top end thereof is guided to the inside of the display housing 7. The second cooperation wire 71 extends between the second end of the second cooperation rod 69 and the third cooperation rod 70 along the width direction of the display housing 7.

FIG. 11 shows a state in which the operation lever 61 is in the first operation position. In the first operation position, both the engaging members 31 are pushed into the recesses 29 of the brake shafts 23 by the coil springs 32. As a result, the first cooperation rod 64 operated in conjunction with one of the engaging members 31 is forced clockwise about the pivot shaft 67, and kept extending in the height direction of the display housing 7. The second cooperation rod 69 operated in conjunction with the other engaging member 31 is forced counterclockwise about the pivot shaft 72, and kept extending in the height direction of the display housing 7.

FIG. 12 shows a state in which the operation lever 61 is in the second operation position. In the second operation position, the first cooperation wire 65 is pulled by the operation lever 61. As a result, the first cooperation rod 64 is rotated counterclockwise, so that the one of the engaging members 31 is drawn from the recess 29 against the urging force of the coil spring 32.

In addition, as the operation lever 61 slides, the second cooperation rod 69 is rotated clockwise about the pivot shaft 72. With this rotation, the second cooperation wire 71 is pulled and the third cooperation rod 70 draws the other engaging member 31 out of the recess 29 against the urging force of the coil spring 32. As a result, the coupling between the display unit 3 and the brake shafts 23 is released.

With the above structure, the movement of the single operation lever 61 is transmitted to the two engaging members 31 through the first and second cooperation mechanisms 62 and 63. Therefore, although the two engaging members 31 moves in the opposite directions, the coupling between the display unit 3 and the braking mechanisms 21 can be released by operating the single operation lever 61 with one hand. Thus, the operability increases.

Figure 13:
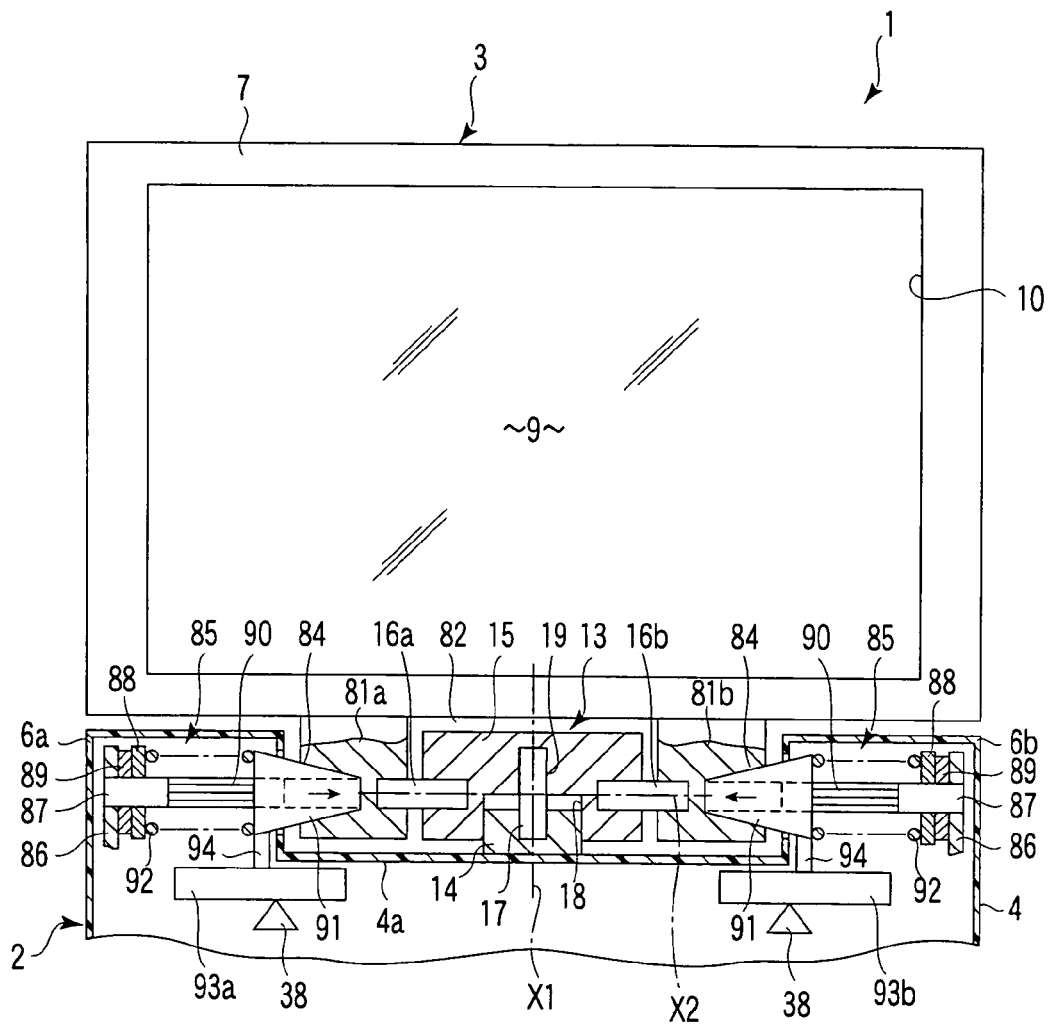
FIG. 13 is a cross-sectional view of the portable computer according to a fifth embodiment of the present invention, which shows a state in which engaging members are in an engagement position to connect a display unit and a braking mechanism.
Figure 14:
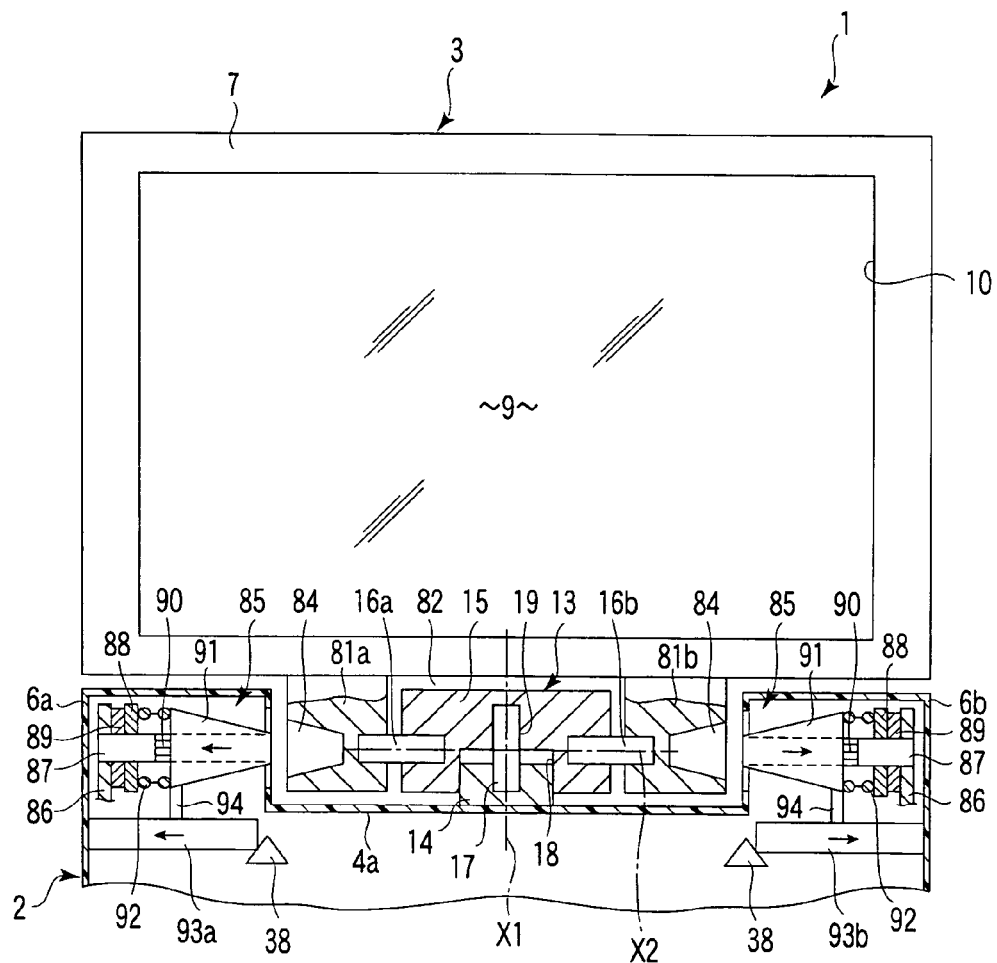
FIG. 14 is a cross-sectional view of the portable computer according to the fifth embodiment, which shows a state in which the engaging members are in an engagement release position to release the connection between the display unit and the braking mechanism.

FIGS. 13 and 14 show a fifth embodiment of the present invention.

According to the fifth embodiment, the display housing 7 of the display unit 3 has leg portions 81a and 81b and a hinge holding portion 82. The leg portions 81a and 81b are projected from the display housing 7 toward the housing 4 and separated from each other in the width direction of the display housing 7. The hinge holding portion 82 is to hold the hinge mechanism 13 and located between the leg portions 81a and 81b. The first shafts 16a and 16b of the hinge mechanism 13 extend between the support bracket 15 and the leg portions 81a and 81b, and rotatably connect them.

The leg portions 81a and 81b have recesses 84 formed in the opposite sides from the hinge holding portion 82. Open ends of the recesses 84 face the hollow projections 6a and 6b of the housing 4. The recess 84 has an opening shaped as, for example, a regular octagon. The inner diameter of the recess 84 gradually reduces from the opening edge toward the innermost end of the recess.

The hollow projections 6a and 6b of the housing 4 respectively store braking mechanisms 85. Each of the braking mechanisms 85 has a bracket 86, a brake shaft 87, a washer receiver 88 and a spring washer 89. The bracket 86 is fixed to the housing 4. The brake shaft 87 is rotatably supported by the bracket 86 and arranged horizontally along the width direction of the housing 4. The brake shaft 87 is coaxial with the first shafts 16a and 16b of the hinge mechanism 13. The circumferential surface of the brake shaft 87 has a plurality of splines 90. The washer receiver 88 is fixed to the circumferential surface of the brake shaft 87 and faces the bracket 86.

The spring washer 89 is sandwiched between the washer receiver 88 and the bracket 86. The spring washer 89 is slidably pressed against the washer receiver 88. Friction force is generated in a contact portion between the washer receiver 88 and the spring washer 89. The friction force functions as braking force which restrains the brake shaft 87 from freely rotating in the circumferential direction of the shaft.

An engaging member 91 is attached to the circumferential surface of the brake shaft 87. The engaging member 91 has a cross section of, for example, a regular octagon. The outer diameter of the engaging member 91 gradually reduces from one end toward the other end. The engaging member 91 is arranged coaxially with the brake shaft 87 and the first shafts 16a and 16b of the hinge mechanism 13.

The engaging member 91 is fitted on the splines 90 formed on the brake shaft 87. With this fitting, the engaging member 91 can be rotated integrally with the brake shaft 87, while it is movable in the axial direction of the brake shaft 87. The engaging member 91 is movable between an engagement position and an engagement release position on the brake shaft 87.

FIG. 13 shows the state in which engaging members 91 are in the engagement position. In the engagement position, the engaging members 91 are inserted and fitted in the recesses 84. FIG. 14 shows the state in which the engaging members 91 are in the engagement release position. In the engagement release position, the engaging members 91 are removed from the recesses 84 and retracted inside the hollow projections 6a and 6b of the housing 4. The engaging members 91 are always elastically urged toward the engaging position by the coil springs 92.

As shown in FIGS. 13 and 14, the housing 4 of the main unit 2 has a pair of operation levers 93a and 93b as operating members. The operation levers 93a and 93b are arranged, for example, in left and right side end portions of the upper surface 4a of the housing 4, and manually operated by an operator. The operation levers 93a and 93b are slidable in the width direction of the housing 4 between a first operation position to move the engaging members 91 to the engagement position and a second operation position to move the engaging members 91 to the engagement release position.

Each of the operation members 93a and 93b has a cooperation rod 94. The cooperation rods 94 extend to the insides of the hollow projections 6a and 6b and connected to the engaging members 91.

FIG. 13 shows a state in which the operation levers 93a and 93b are in the first operation position. In the first operation position, the engaging members 91 are moved to the leg portions 81a and 81b by the operation rods 94 of the operation levers 93a and 93b. With this movement, the engaging members 91 are fitted in the recesses 84 of the leg portions 81a and 81b. The leg portions 81a and 81b are connected to the brake shafts 87 of the braking mechanisms 85 via the engaging members 91.

FIG. 14 shows a state in which the operation levers 93a and 93b are in the second operation position. In the second operation position, the engaging members 91 are moved away from the recesses 84 by the cooperation rods 94 of the operation levers 93a and 93b. As a result, the engaging members 91 are retracted inside the hollow projections 6a and 6b of the housing 4 against the urging force of the coil springs 92, and the coupling between the leg portions 81a and 81b of the display unit 3 and the brake shafts 87 of the braking mechanisms 85 is released.

With the above structure, the display unit 3 can be connected to the braking mechanisms 85 or released therefrom by sliding the engaging members 91 to the engagement position or the engagement release position. Therefore, as long as the engaging members 91 are in the engagement position, the display unit 3 is supported to the housing 4 of the main unit 2 at the three positions: the hinge mechanism 13 and the pair of braking mechanisms 21.

As a result, when the display unit 3 is rotated between the closed position and the open position, the torque exerted on the connecting portion between the display unit 3 and the hinge mechanism 13 is distributed to the brake shafts 87 of the braking mechanisms 85.

Figure 15:
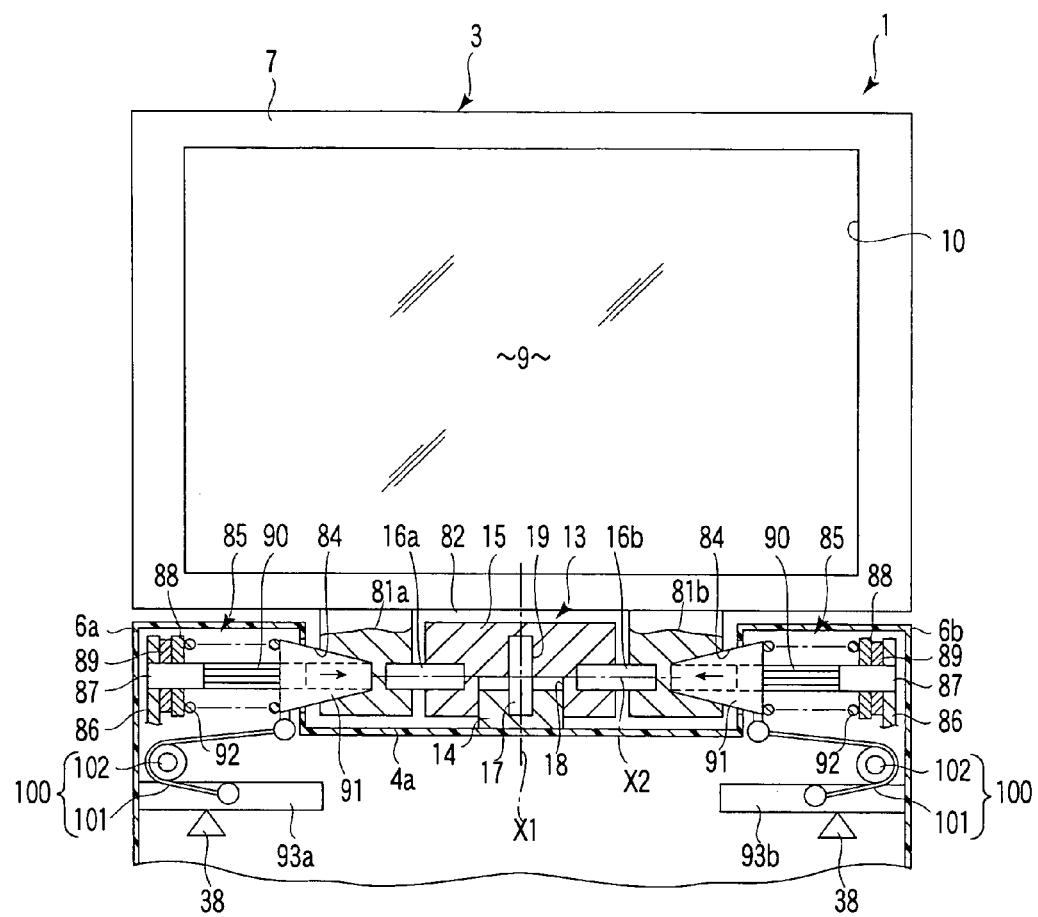
FIG. 15 is a cross-sectional view of the portable computer according to a sixth embodiment of the present invention, which shows a state in which engaging members are in an engagement position to connect a display unit and a braking mechanism.

FIGS. 15 and 16 show a sixth embodiment of the present invention.

The sixth embodiment is different from the fifth embodiment in structure for sliding the engaging members 91 to the engagement position or the engagement release position. The other basic structure of the portable computer 1 is the same as that of the fifth embodiment.

The operation levers 93a and 93b are individually operated in conjunction with the engaging members 91 via cooperation mechanisms 100. Each of the cooperation mechanism 100 has a cooperation wire 101 and a pulley 102. The cooperation wire 101 is routed to connect between the engaging member 91 and the operation levers 93a or 93b. The pulley 102 is supported to the housing 4. The pulley 102 is located between the brake shaft 87 and the operation levers 93a or 93b, and shifted from the engaging member 91 toward the left or right side of the housing 4. The cooperation wire 101 is put on the pulley 102. Thus, the cooperation wires 101 extend through the pulley 102 in the sliding direction of the operation levers 93a and 93b.

FIG. 15 shows a state in which the operation levers 93a and 93b are in the first operation position. In the first operation position, both engagement members 91 are pushed out to the engagement position by the coil springs 92 and fitted in the recesses 84 of the display unit 3. By this engagement, the leg portions 81a and 81b of the display unit 3 are coupled with the brake shafts 87 of the braking mechanisms 85.

FIG. 16 shows a state in which the operation levers 93a and 93b are in the second operation position. In the second operation position, the engaging members 91 are removed away from the recesses 84 by the cooperation wires 101. As a result, the engaging members 91 are retracted inside the hollow projections 6a and 6b against the urging force of the coil springs 92. Thus, the coupling between the leg portions 81a and 81b of the display unit 3 and the brake shafts 87 of the braking mechanisms 85 is released.

Figure 17:
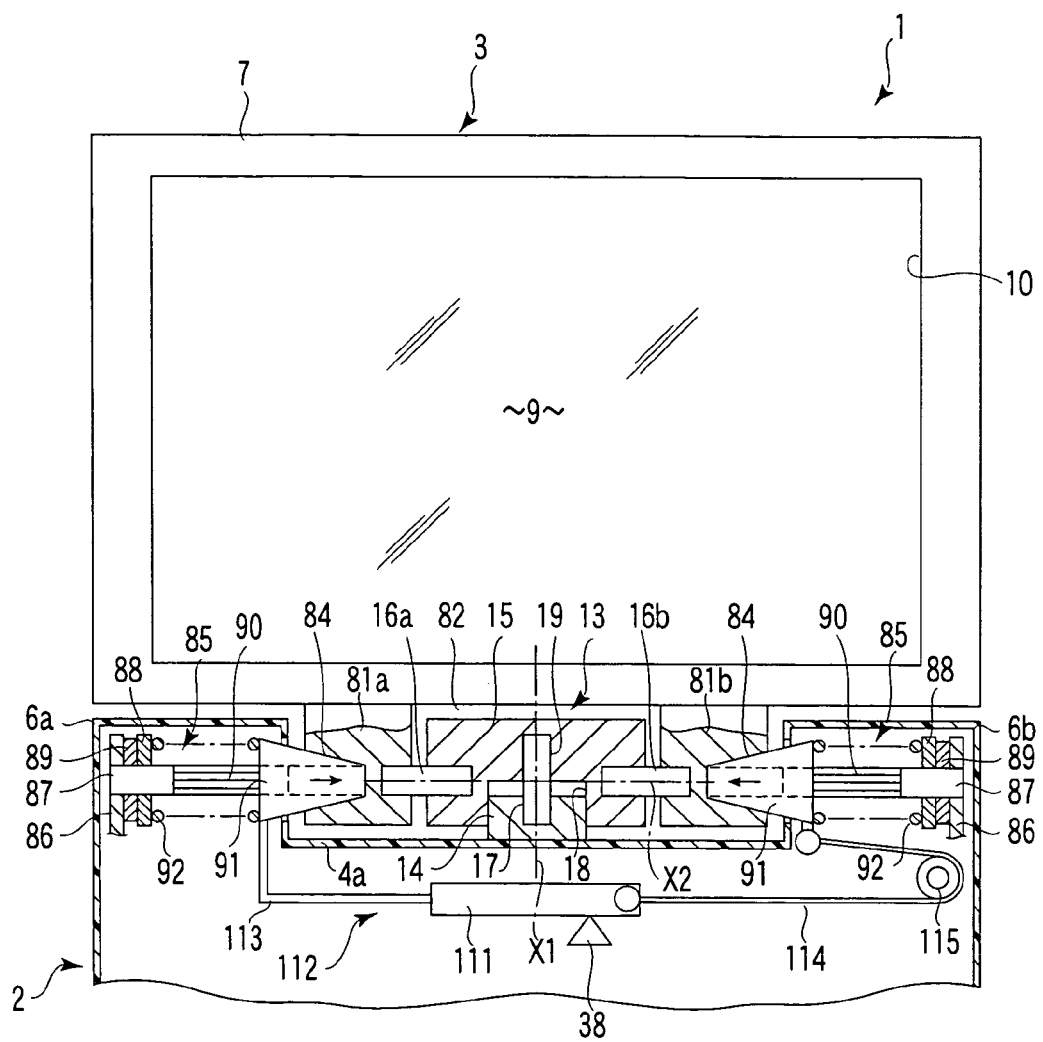
FIG. 17 is a cross-sectional view of the portable computer according to a seventh embodiment of the present invention, which shows a state in which an engaging members are in an engagement position to connect a display unit and a braking mechanism.

FIGS. 17 and 18 show a seventh embodiment of the present invention.

The seventh embodiment is different from the fifth embodiment in structure for sliding the engaging members 91 to the engagement position or the engagement release position.

As shown in FIGS. 17 and 18, the main unit 2 has an operation lever 111 as an operation member. The operation lever 111 is arranged, for example, in a central portion of the upper surface 4a of the housing 4. The operation lever 111 is slidable in the width direction of the housing 4 between a first operation position to move the engaging members 91 to the engagement position and a second operation position to move the engaging members 91 to the engagement release position.

The operation lever 111 is operated in conjunction with both the engaging members 91 via a cooperation mechanism 112. The cooperation mechanism 112 has a cooperation rod 113, a cooperation wire 114 and a pulley 115. The cooperation rod 113 directly connects one end of the operation lever 111 to one of the engaging members 91. The cooperation wire 114 is routed to connect between the other end of the operation lever 111 and the other engaging member 91. The pulley 115 is supported to the housing 4. The pulley 115 is shifted from the cooperation lever 111 and the other engaging member 91 toward the right side of the housing 4. The cooperation wire 114 is put on the pulley 115. Thus, the cooperation wire 114 extends through the pulley 115 in the sliding direction of the operation lever 111.

FIG. 17 shows a state in which the operation lever 111 is in the first operation position. In the first operation position, both the engaging members 91 are pushed out toward the engagement position by the coil springs 92 and fitted in the recesses 84 of the display unit 3. By this engagement, the leg portions 81a and 81b of the display unit 3 are coupled with the brake shafts 87 of the braking mechanisms 85.

FIG. 18 shows a state in which the operation lever 111 is in the second operation position. In the second operation position, the movement of the operation lever 111 is directly transmitted to the one engaging member 91 through the cooperation rod 113, and this engagement member 91 is drawn out of the recess 84. At the same time, the movement of the operation lever 111 is transmitted to the other engaging member 91 through the cooperation wire 114, and this engaging member 91 is drawn out of the recess 84.

As a result, the engaging members 91 are retracted inside the hollow projections 6a and 6b against the urging force of the coil springs 92, and the coupling between the leg portions 81a and 81b of the display unit 3 and the brake shafts 87 of the braking mechanisms 85 is released.

With the above structure, the movement of the single operation lever 111 is transmitted to the two individual engaging members 91 through the cooperation mechanism 112. Therefore, although the two engaging members 91 moves in the opposite directions, the coupling between the display unit 3 and the braking mechanisms 85 can be released by operating the single operation lever 111 with one hand. Thus, the operability increases.

An eighth embodiment of the present invention will now be described with reference to FIGS. 19 and 20.

According to the eighth embodiment, the hollow projections 6a and 6b of the housing 4 respectively store braking mechanisms 120. Each of the braking mechanisms 120 has a bracket 121, a brake shaft 122, a plurality of washer receivers 123 and a plurality of spring washers 124.

The bracket 121 is fixed to a boss portion 125 of the housing 4 by a screw 126. The brake shaft 122 is rotatably supported by the bracket 121 and arranged horizontally along the width direction of the housing 4. The brake shaft 122 is coaxial with the first shafts 16a and 16b of the hinge mechanism 13. The washer receivers 123 are fixed to the circumferential surface of the brake shaft 122 and arranged at intervals in the axial direction of the brake shaft 122.

Each spring washer 124 is sandwiched between the adjacent washer receivers and between the bracket 121 and one of the washer receivers 123. The spring washers 124 are slidably pressed against the washer receivers 123 and the bracket 121. Therefore, friction force is generated in a contact portion between the washer receiver 123 and the spring washer 124 and between the bracket 121 and the spring washer 124. The friction force functions as braking force which restrains the brake shaft 122 from freely rotating.

The brake shafts 122 of the braking mechanism 120 extend in the direction opposite to the hinge mechanism 13. The distal ends of the brake shafts 122 protrude out of the hollow projections 6a and 6b of the housing 4. Columnar rotary bodies 128 are fixed to the protruding portions of the brake shafts 122. The rotary bodies 128 are coaxial with the brake shafts 122, and located at the left and right side end portions of the housing 4.

Each of the rotary bodies 128 has a recess 129, which is opened in the circumferential surface thereof. The recess 129 has an opening shaped as, for example, a regular octagon. The inner diameter of the recess 129 gradually reduces from the opening edge toward the innermost end of the recess.

The display housing 7 of the display unit 3 has a pair of engaging members 130. The engaging members 130 are located in the left and right side end portions of the display housing 7, and face the recesses 129 of the rotary bodies 128. Each engaging member 130 has a cross section of, for example, a regular octagon, and the outer diameter thereof gradually reduces from one end toward the other end.

The engaging members 130 are supported to the display housing 7 so as to be slidable between an engagement position and an engagement release position. FIG. 19 shows a state in which the engaging members 130 are in the engagement position. In the engagement position, the engaging members 130 are projected out of the display housing 7, fitted in and engaged with the recesses 129 of the rotary bodies 128.

Figure 20:
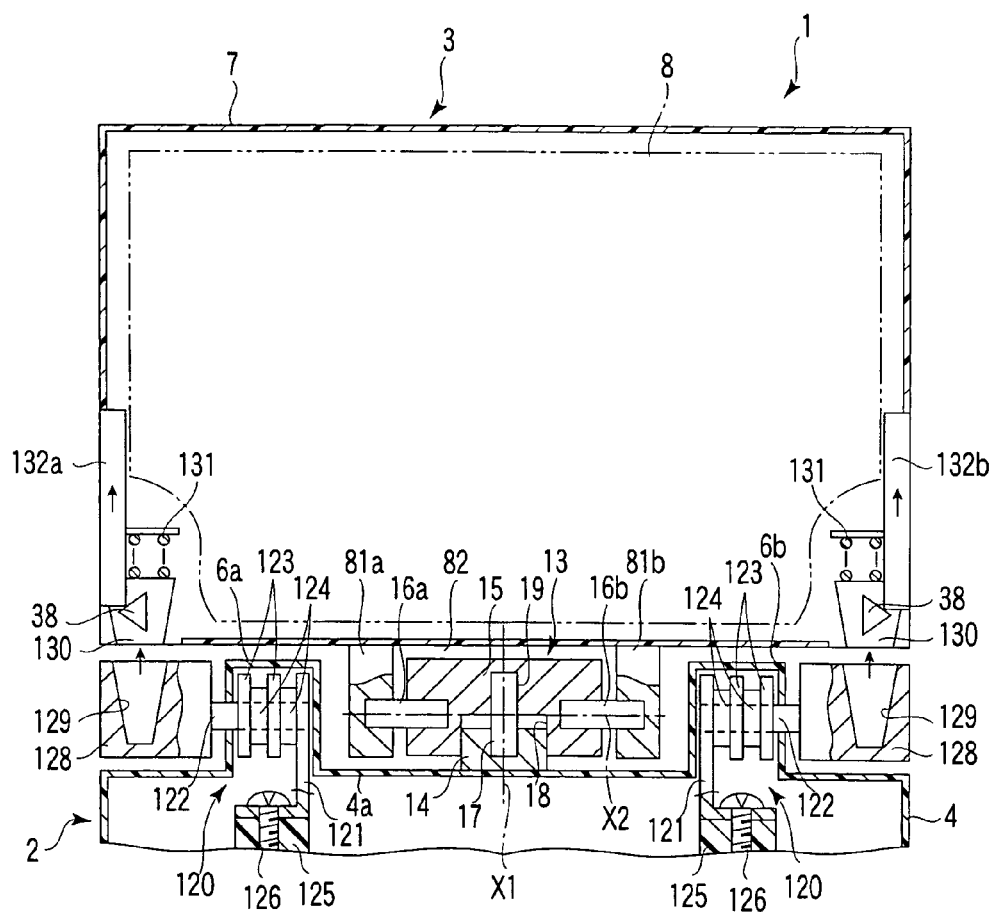
FIG. 20 is a cross-sectional view of the portable computer according to the eighth embodiment, which shows a state in which the engaging members are in an engagement release position to release the connection between the display unit and the braking mechanism.

FIG. 20 shows a state in which the engaging members 130 are in the engagement release position. In the engagement release position, the engaging members 130 are removed from the recesses 129 and retracted inside the display housing 7. The engaging members 130 are always forced elastically toward the engagement position by coil springs 131.

The display unit 3 has a pair of operation levers 132a and 132b as operation members. The operation levers 132a and 132b are arranged on left and right side end portions of the display housing 7, and first ends of the operation levers 132a and 132b are connected to the engaging members 130. The operation levers 132a and 132b are supported by the display housing 7 so as to be slidable between a first operation position to move the engaging members 130 to the engagement position and a second operation position to move the engaging members 130 to the engagement release position.

Figure 19:
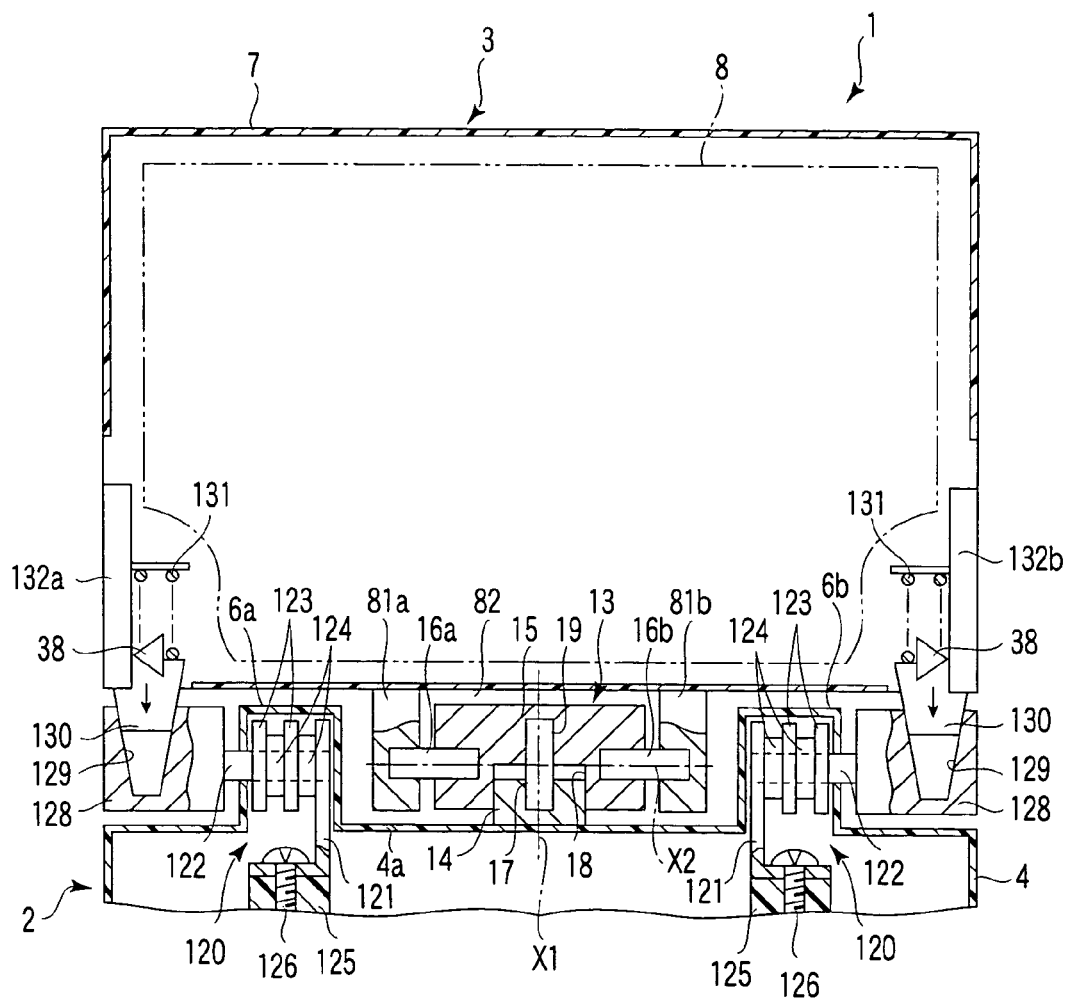
FIG. 19 is a cross-sectional view of the portable computer according to an eighth embodiment of the present invention, which shows a state in which engaging members are in an engagement position to connect a display unit and a braking mechanism.

FIG. 19 shows a state in which the operation levers 132a and 132b are in the first operation position. In the first operation position, the engaging members 130 are pushed out to the engagement position by the coil springs 131 and fitted in the recesses 129 of the rotary bodies 128. By this engagement, the display housing 7 of the display unit 3 is coupled with the brake shafts 122 of the braking mechanisms 120.

FIG. 20 shows a state in which the operation levers 132a and 132b are in the second operation position. In the second operation position, the engaging members 130 are in the engagement release position and drawn out of the recesses 129 of the rotary bodies 128. As a result, the engaging members 130 are retracted inside the display housing 7 against the urging force of the coil springs 131, and the coupling between the display unit 3 and the brake shafts 122 of the braking mechanisms 120 is released.

With the above structure, the display unit 3 can be connected to the braking mechanisms 120 or released therefrom by sliding the engaging members 130 to the engagement position or the engagement release position. Therefore, as long as the engaging members 130 are in the engagement position, the display unit 3 is supported to the housing 4 of the main unit 2 at the three positions: the hinge mechanism 13 and the pair of braking mechanisms 120. As a result, when the display unit 3 is rotated between the closed position and the open position, the torque exerted on the connecting portion between the display unit 3 and the hinge mechanism 13 is distributed to the brake shafts 122 of the braking mechanisms 120.

Figure 21:
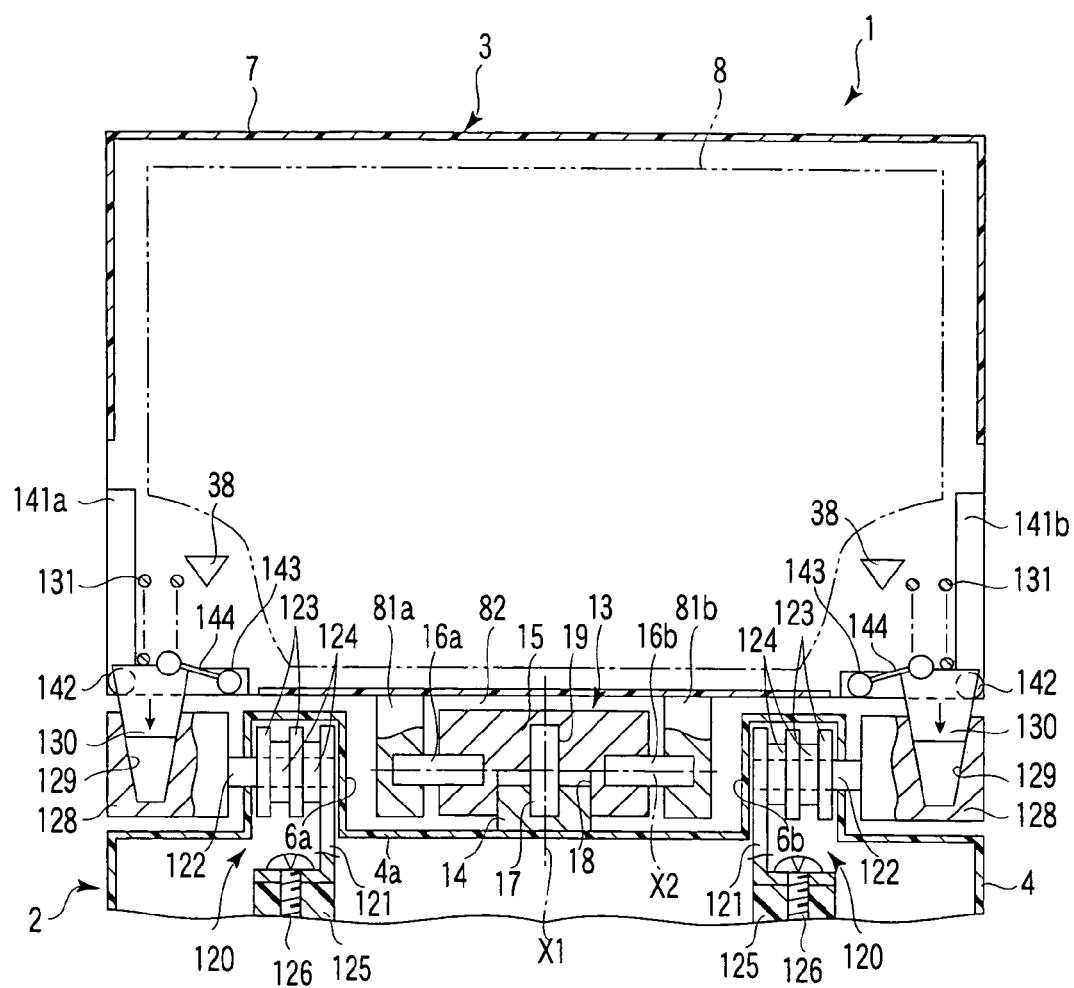
FIG. 21 is a cross-sectional view of the portable computer according to a ninth embodiment of the present invention, which shows a state in which engaging members are in an engagement position to connect a display unit and a braking mechanism.
Figure 22:
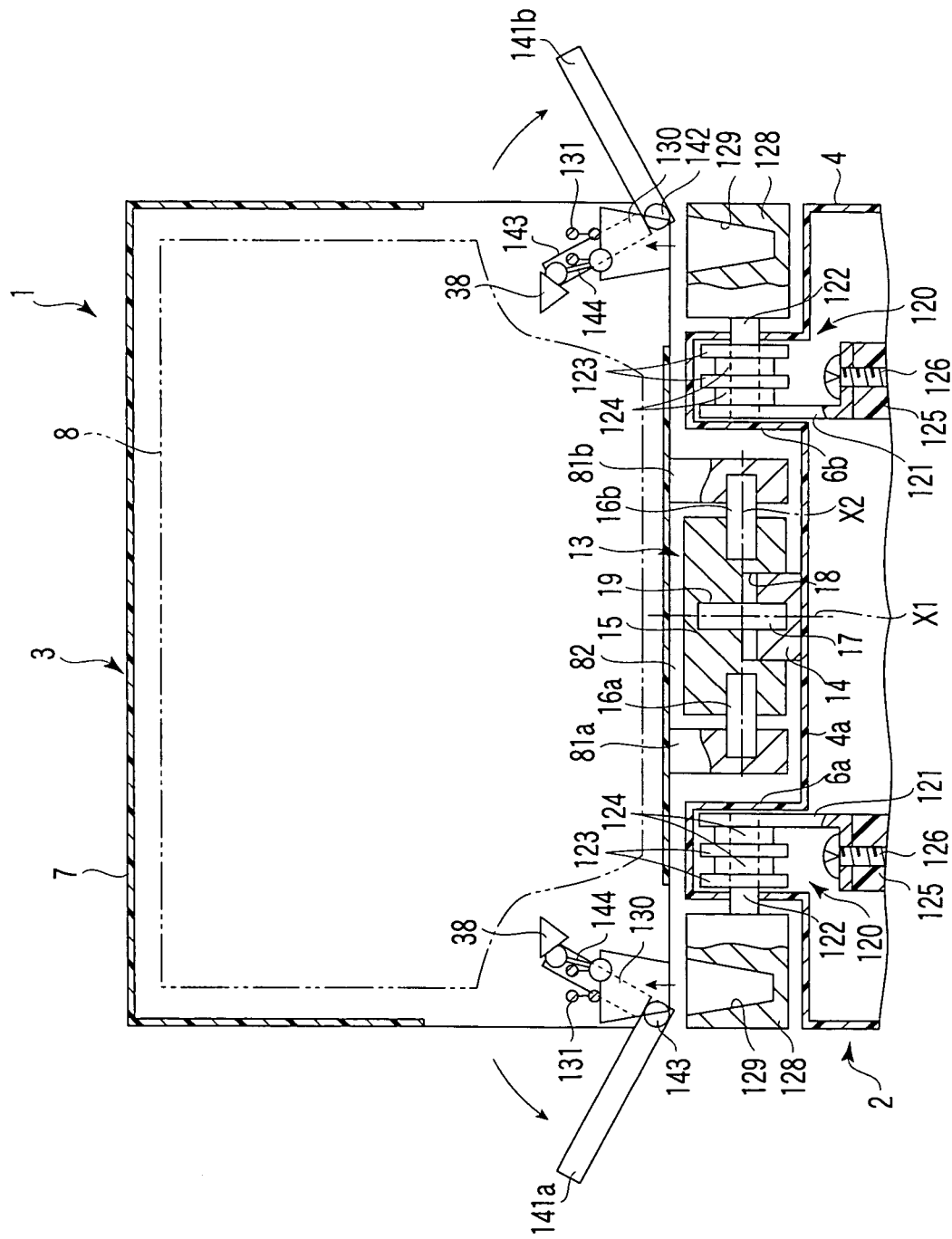
FIG. 22 is a cross-sectional view of the portable computer according to the ninth embodiment, which shows a state in which the engaging members are in an engagement release position to release the connection between the display unit and the braking mechanism.

FIGS. 21 and 22 show a ninth embodiment of the present invention.

The ninth embodiment is different from the eighth embodiment in structure for sliding the engaging members 130 to the engagement position or the engagement release position. The other basic structure of the portable computer 1 is the same as that of the eighth embodiment.

As shown in FIGS. 21 and 22, the display unit 3 has a pair of operation levers 141a and 141b as operation members. The operation levers 141a and 141b serve to move the engaging members 130 to the engagement position or the engagement release position. The operation levers 141a and 141b are rotatably supported to left and right side portions of the display housing 7 with pivot shafts 142.

Each of the operation levers 141a and 141b has an arm portion 143, which extends toward the inside of the display housing 7. The arm portion 143 is adjacent to the engaging member 130. The distal end of the arm portion 143 is connected to the engaging member 130 through a cooperation wire 144. Thus, the operation levers 141a and 141b are slidable between a first operation position to move the engaging members 130 to the engagement position and a second operation position to move the engaging members 130 to the engagement release position.

FIG. 21 shows a state in which the operation levers 141a and 141b are in the first operation position. In the first operation position, the engagement members 130 are pushed out to the engagement position by the coil springs 130 and fitted in the recesses 129 of the rotary bodies 128. By this engagement, the display housing 7 of the display unit 3 is coupled with the brake shafts 122 of the braking mechanisms 120. At this time, the operation levers 141a and 141b stand along the left and right sides of the display housing 7. In addition, the arm portions 143 are arranged horizontally in proximity to the engaging members 130 in the engagement position.

FIG. 22 shows a state in which the operation levers 141a and 141b are in the second operation position. In the second operation position, the operation levers 141a and 141b are protruded out of the left and right sides of the display housing 7, so that the distal ends of the arm portions 143 are moved to points above the engaging members 130. With this movement, the cooperation wires 144 are pulled against the urging force of the coil springs 131 and draw the engaging members 130 out of the recesses 129. As a result, the coupling between the display unit 3 and the brake shafts 122 of the braking mechanisms 120 is released.

Figure 23:
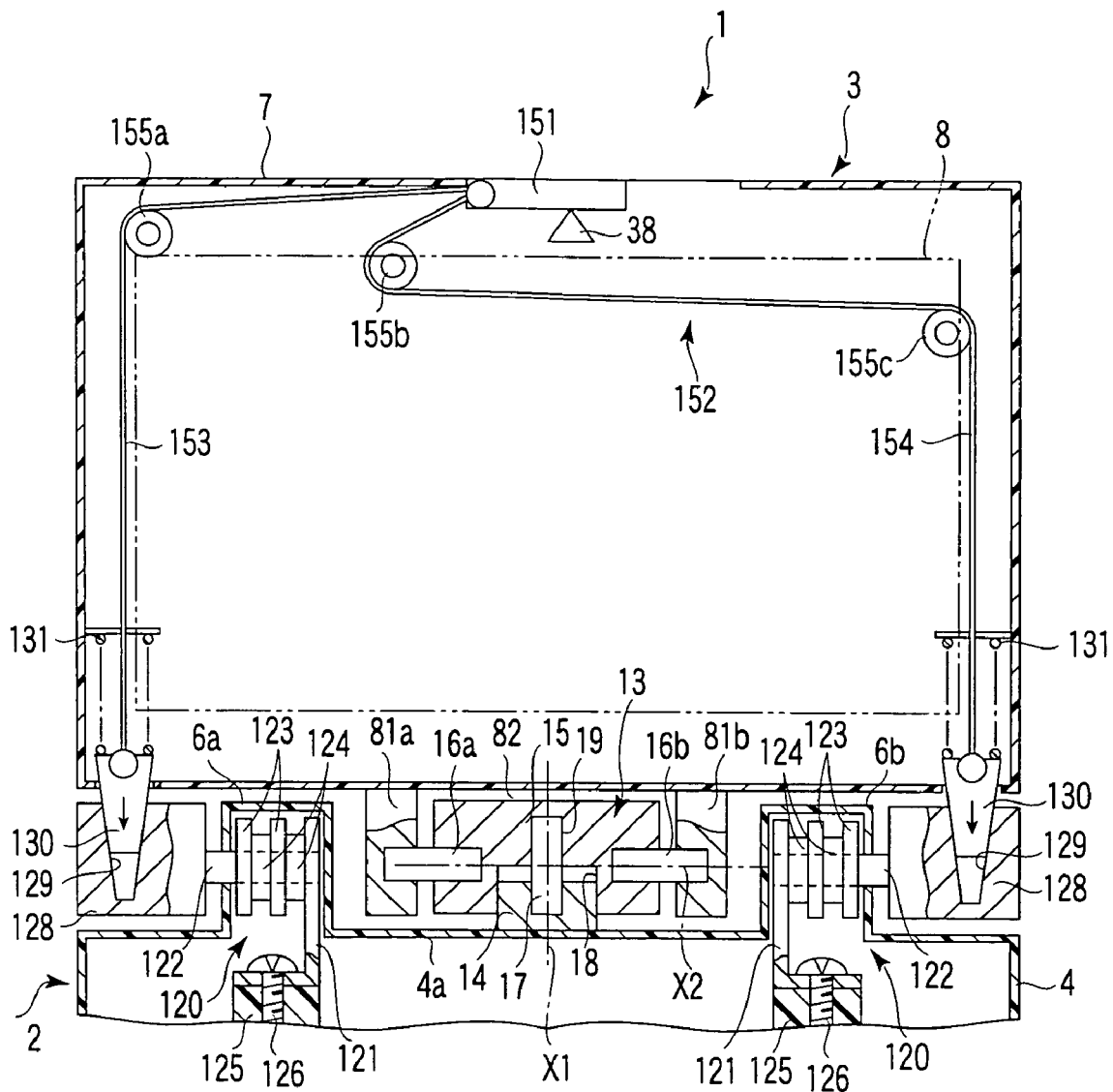
FIG. 23 is a cross-sectional view of the portable computer according to a tenth embodiment of the present invention, which shows a state in which engaging members are in an engagement position to connect a display unit and a braking mechanism.

FIGS. 23 and 24 show a tenth embodiment of the present invention.

The tenth embodiment is different from the eighth embodiment in structure for sliding the engaging members 130 to the engagement position or the engagement release position.

As shown in FIGS. 23 and 24, the display housing 7 of the display unit 3 has an operation lever 151 as an operation member. The operation lever 151 is arranged in a central portion of the upper end of the display housing 7. In other words, the operation lever 61 is located on the opposite side of the liquid crystal display panel 8 from the leg portions 81a and 81b of the display housing 7. The operation lever 151 is slidable in the width direction of the display housing 7 between a first operation position to move the engaging members 130 to the engagement position and a second operation position to move the engaging members 130 to the engagement release position.

The operation lever 151 is operated in conjunction with both engaging members 130 via a cooperation mechanism 152. The cooperation mechanism 152 has a first cooperation wire 153, a second cooperation wire 154 and first to third pulleys 155a, 155b and 155c.

The first cooperation wire 153 is routed to connect one of the engaging members 130 and one end of the operation lever 151. The first pulley 155a is supported to the display housing 7 and positioned just above the one engaging member 130. The first cooperation wire 153 is put on the pulley 155a. Therefore, the first cooperation wire 153 changes its direction at the pulley 155a substantially at 90° and extends along the sliding direction of the one engaging member 130 and the sliding direction of the operation lever 151.

The second cooperation wire 154 is routed to connect the other engaging member 130 and the other end of the operation lever 151. The second and third pulleys 155b and 155c are supported to the display housing 7. The second pulley 155b is positioned near the one end of the operation lever 151, while the third pulley 155c is located just above the other engaging member 130. The second and third pulleys 155b and 155c are separated from each other in the width direction of the display housing 7. The second cooperation wire 154 is put on the second and third pulleys 155b and 155c. Therefore, the second cooperation wire 154 changes its direction at the pulley 155c substantially at 90° and extends along the sliding direction of the other engaging member 130 and the sliding direction of the operation lever 151.

FIG. 23 shows a state in which the operation lever 151 is in the first operation position. In the first operation position, the engagement members 130 are pushed out to the engagement position by the coil springs 131 and fitted in the recesses 129 of the rotary bodies 128. By this engagement, the display unit 3 is coupled with the brake shafts 122 of the braking mechanisms 120.

FIG. 24 shows a state in which the operation lever 151 is in the second operation position. In the second operation position, the first and second cooperation wires 153 and 154 are pulled following to the movement of the operation lever 151, so that the engaging members 130 are drawn out of the recesses 129. As a result, the engaging members 130 are retracted inside the display housing 7 against the urging force of the coil springs 131. Thus, the coupling between the display unit 3 and the brake shafts 122 of the braking mechanism 120 is released.

With the above structure, the movement of the single operation lever 151 is transmitted to the two engaging members 130 through the first and second cooperation wires 153 and 154. Therefore, to release the coupling between the display unit 3 and the braking mechanisms 120, it is only necessary to operate the single operation lever 151 with one hand. Thus, the operability increases.

Figure 25:
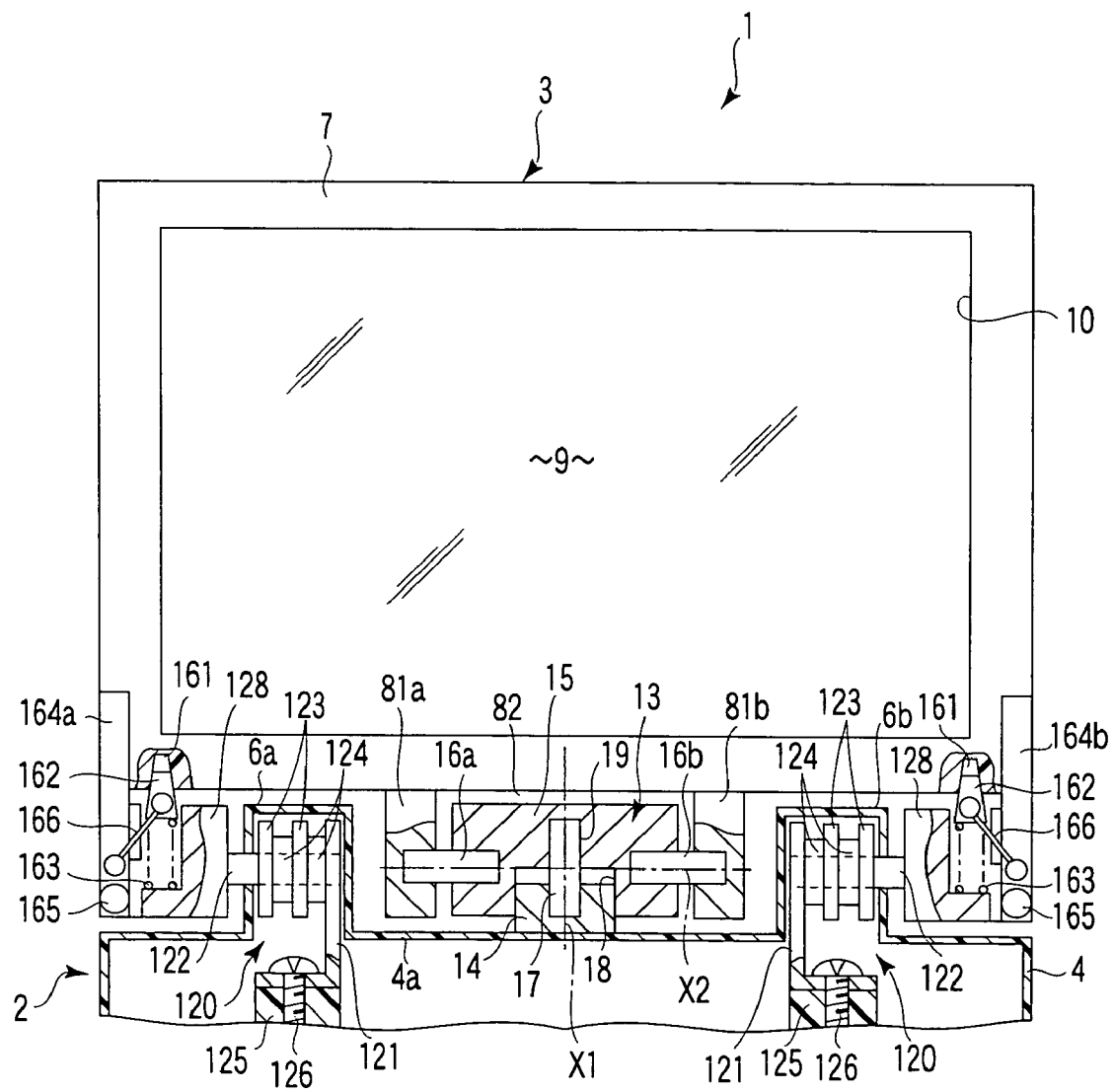
FIG. 25 is a cross-sectional view of the portable computer according to an eleventh embodiment of the present invention, which shows a state in which engaging members are in an engagement position to connect a display unit and a braking mechanism.
Figure 26:
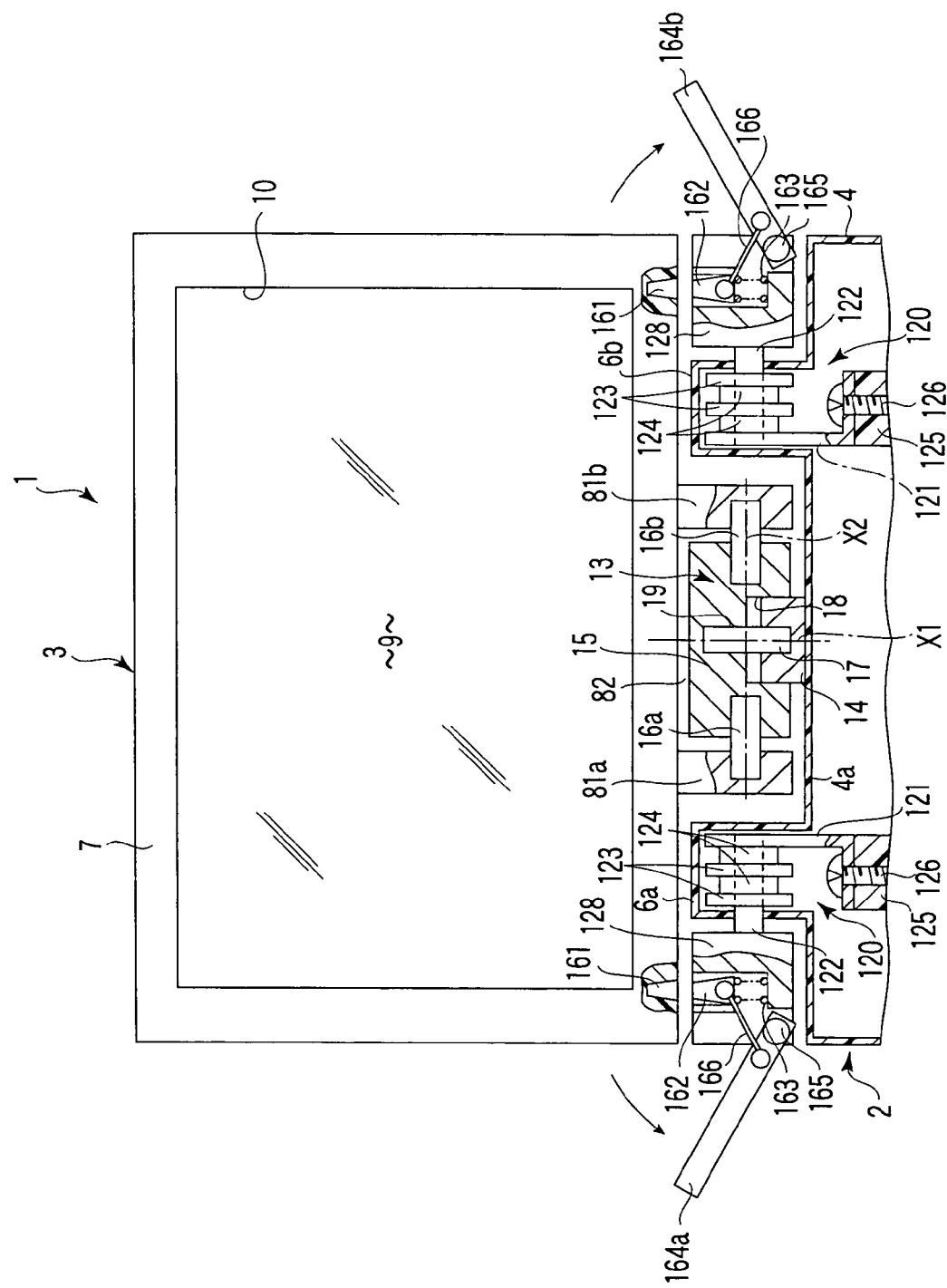
FIG. 26 is a cross-sectional view of the portable computer according to the eleventh embodiment, which shows a state in which the engaging members are in an engagement release position to release the connection between the display unit and the braking mechanism.

FIGS. 25 and 26 show an eleventh embodiment of the present invention.

In the eleventh embodiment, recesses 161 are formed in left and right side end portions of the display housing 7. The recesses 161 are opened in the lower surface of the display housing 7 and respectively face the circumferential surfaces of the rotary bodies 128.

The rotary bodies 128 respectively have pin-like engaging members 162. The engaging members 162 are supported by the rotary bodies 128 so as to be movable between an engagement position and an engagement release position. FIG. 25 shows a state in which the engaging members 162 are in the engagement position. In the engagement position, the engaging members 162 are projected out of the circumferential surface of the rotary bodies 128 and fitted in the recesses 161 of the display housing 7. FIG. 26 shows a state in which the engaging members 162 are in the engagement release position. In the engagement release position, the engaging members 162 are removed from the recesses 161 and-retracted inside the rotary bodies 128. The engaging members 162 are always forced elastically toward the engagement position by coil springs 163.

The main unit 2 has a pair of operation levers 164a and 164b as operation members. The operation levers 164a and 164b are supported to end portions of the rotary bodies 128 with pivot shafts 165, and coupled to the engaging members 162 through cooperation wires 166. Thus, the operation levers 164a and 164b are rotatable between a first operation position to move the engaging members 162 to the engagement position and a second operation position to move the engaging members 162 to the engagement release position.

FIG. 25 shows a state in which the operation levers 164a and 164b are in the first operation position. In the first operation position, the operation levers 164a and 164b extend in the direction perpendicular to the brake shafts 122, and stored in the end portions of the rotary bodies 128. The engaging members 162 are pushed out to the engagement position by the coil springs 163 and fitted in the recesses 161 of the display housing 7. Thus, the display unit 3 is kept coupled with the brake shafts 122 of the braking mechanisms 120.

FIG. 26 shows a state in which the operation levers 164a and 164b are in the second operation position. In the second operation position, the operation levers 164a and 164b project out of the rotary bodies 128 leftward and rightward. Due to the rotation of the operation levers 164a and 164b, the cooperation wires 166 are pulled downward, and the engaging members 162 are drawn out of the recesses 161. As a result, the engaging members 162 are removed out of the recesses 161 against the urging force of the coil springs 163. Thus, the coupling between the display unit 3 and the brake shafts 122 of the braking mechanisms 120 is released.

Figure 27:
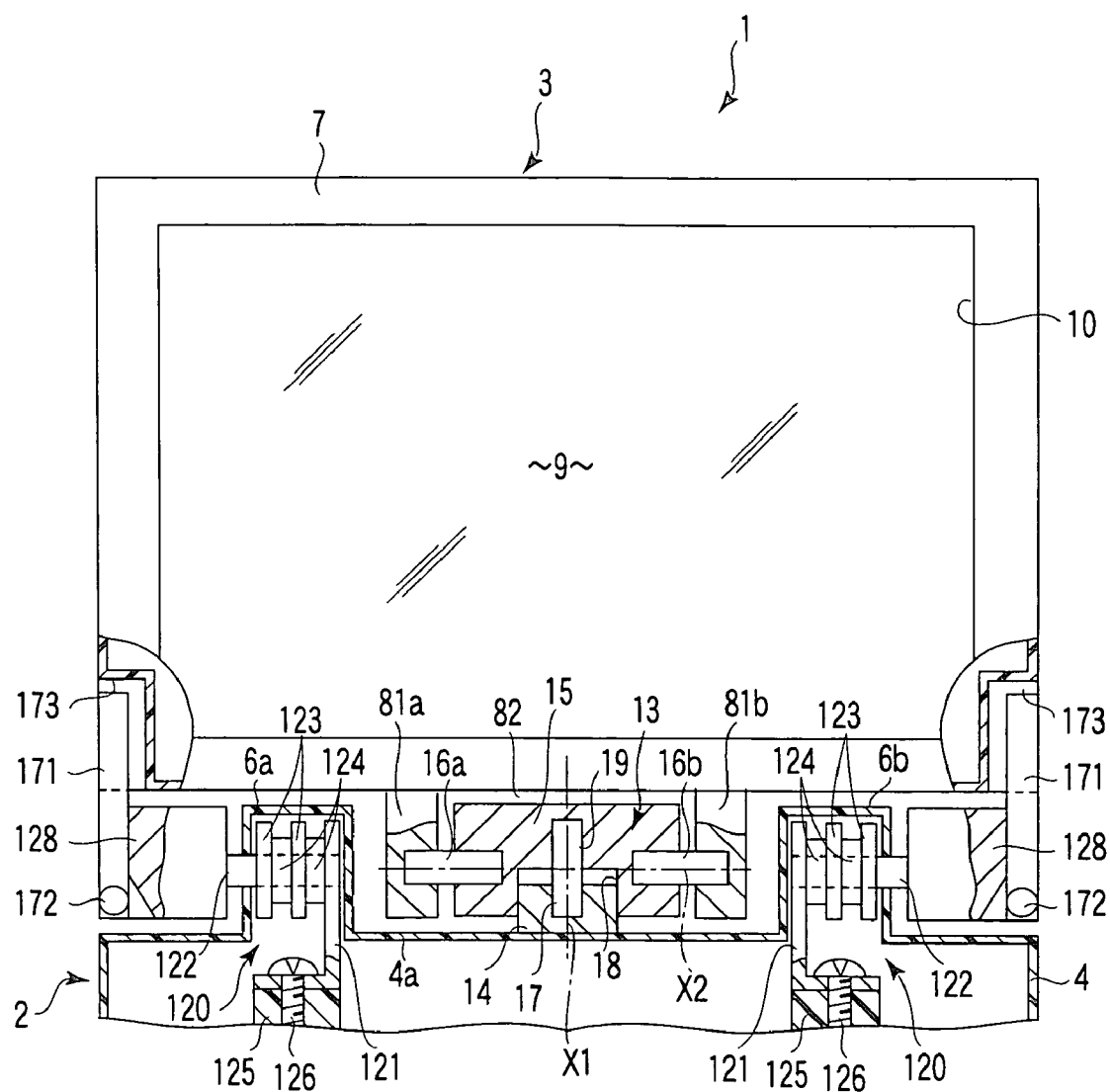
FIG. 27 is a cross-sectional view of the portable computer according to a twelfth embodiment of the present invention, which shows a state in which engaging members are in an engagement position to connect a display unit and a braking mechanism.
Figure 28:
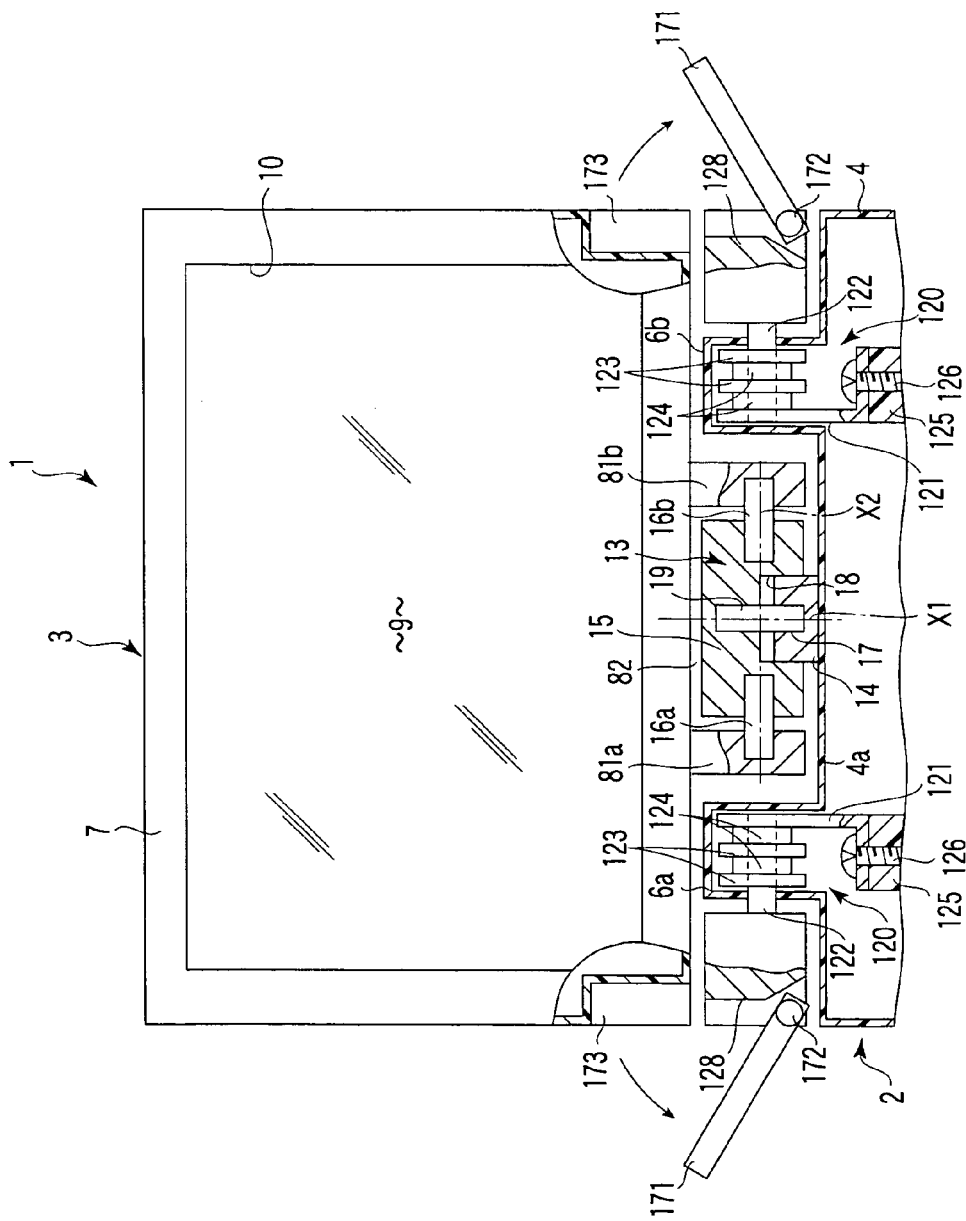
FIG. 28 is a cross-sectional view of the portable computer according to the twelfth embodiment, which shows a state in which the engaging members are in an engagement release position to release the connection between the display unit and the braking mechanism.

FIGS. 27 and 28 show a twelfth embodiment of the present invention.

The twelfth embodiment has lock levers 171. First ends of the lock levers 171 are respectively supported by pivot shafts 172 to the rotary bodies 122. The lock levers 171 are rotatable between an engagement position and an engagement release position. FIG. 27 shows a state in which the lock levers 171 are in the engagement position. In the engagement position, the lock levers 171 project radially outward from the circumferential surfaces of the rotary bodies 128. The ends of the projected portions of the lock levers 171 are fitted in recesses 173 formed in the left and right side end portions of the display housing 7. As a result, the display unit 3 is kept coupled with the brake shafts 122 of the braking mechanisms 120.

FIG. 28 shows a state in which the lock levers 171 are in the engagement release position. In the engagement release position, the lock levers 171 project out of the rotary bodies 128 leftward and rightward, and are removed from the recesses 173 of the display housing 7. Therefore, the coupling between the display unit 3 and the brake shafts 122 of the braking mechanisms 120 is released, so that the display unit 3 can be rotated about the second shaft 17.

With the above structure, the display unit 3 can be connected to the braking mechanisms 120 or released therefrom by rotating the lock levers 171 supported by the rotary bodies 128 to the engagement position or the engagement release position. Therefore, as long as the lock levers 171 are in the engagement position, the display unit 3 is supported to the housing 4 of the main unit 2 at the three positions: the hinge mechanism 13 and the pair of braking mechanisms 120.

As a result, when the display unit 3 is rotated between the closed position and the open position, the torque exerted on the connecting portion between the display unit 3 and the hinge mechanism 13 is distributed to the brake shafts 122 of the braking mechanisms 120.

The present invention is not limited to the embodiments described above. For example, the operation members are not limited to the operation levers manually operated by the operator. The operation levers may be replaced by electromagnetic solenoids. In this case, it is preferable that a switch for turning on and off the electromagnetic solenoids be arranged on the upper surface of the housing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
   a main unit;
   a display unit distinct from the main unit;
   a hinge mechanism having first and second shafts, the first shaft connecting the display unit to the main unit such that the display unit is rotatable between a closed position where the display unit overlies the main unit and an open position where the display unit is raised up from the main unit, and the second shaft extending in a direction perpendicular to the first shaft and connecting the display unit to the main unit so as to be rotatable in a circumferential direction of the second shaft;
   a braking mechanism, which is mounted in the main unit and generates braking force that limits rotation of the display unit between the closed position and the open position; and
   an engagement member, which is mounted in the display unit and movable between an engagement position where it is engaged with the braking mechanism and an engagement release position where it is removed from the braking mechanism.

2. The electronic apparatus according to claim 1, wherein the braking mechanism has a pair of brake shafts to which the braking force is applied, the brake shafts and the hinge mechanism are aligned in a width direction of the main unit, and the hinge mechanism is located between the brake shafts.

3. The electronic apparatus according to claim 1, wherein the braking mechanism has a brake shaft to which the braking force is applied, the brake shaft being rotatable in a circumferential direction of the first shaft of the hinge mechanism and having a recess with which the engaging member is removably engaged, when the engaging member is in the engagement position, and the brake shaft being coupled with the display unit by engagement of the engaging member with the recess.

4. The electronic apparatus according to claim 3, wherein the first shaft of the hinge mechanism, the brake shaft and the engaging member are arranged coaxially with one another, and the brake shaft and the display unit are integrally rotated in the circumferential direction of the first shaft by engagement of the engaging member with the recess.

5. The electronic apparatus according to claim 1, wherein the engaging member is always urged toward the engaging position by a spring.

6. The electronic apparatus according to claim 1, further comprising an operation member, which is mounted in the main unit and movable between a first operation position to move the engaging member to the engagement position and a second operation position to move the engaging member to the engagement release position.

7. The electronic apparatus according to claim 6, further comprising a lock member, which secures the operation member in the second operation position, when the operation member is moved to the second operation position.

8. The electronic apparatus according to claim 6, further comprising a cooperation mechanism, which transmits movement of the operation member to the engaging member.

9. An electronic apparatus comprising:
   a main unit;
   a display unit distinct from the main unit, the display unit having a recess;
   a hinge mechanism having first and second shafts, the first shaft connecting the display unit to the main unit such that the display unit is rotatable between a closed position where the display unit overlies the main unit, and an open position where the display unit is raised up from the main unit, and the second shaft extending in a direction perpendicular to the first shaft and connecting the display unit to the main unit so as to be rotatable in a circumferential direction of the second shaft;
   a braking mechanism, which is mounted in the main unit and generates braking force that limits rotation of the display unit between the closed position and the open position, the braking mechanism having a brake shaft to which the braking force is applied; and
   an engagement member, which is supported by the brake shaft of the braking mechanism, and movable between an engagement position where the engagement member is engaged with the recess of the display unit and an engagement release position where the engagement member is removed from the recess of the display unit,
   wherein when the engagement member is moved to the engagement position, the engagement member receives the braking force of the braking mechanism and the display unit is coupled with the brake shaft by engagement of the engagement member with the recess, and the first shaft of the hinge mechanism, the brake shaft and the engagement member are arranged coaxially with one another, and the brake shaft and the display unit are integrally rotated in a circumferential direction of the first shaft by the engagement of the engagement member with the recess.

10. The electronic apparatus according to claim 9, wherein the brake shafts and the hinge mechanism are aligned in a width direction of the main unit.

11. The electronic apparatus according to claim 9, wherein the engaging member is always urged toward the engaging position by a spring.

12. The electronic apparatus according to claim 9, further comprising an operation member, which is mounted in the main unit and movable between a first operation position to move the engaging member to the engagement position and a second operation position to move the engaging member to the engagement release position.

13. The electronic apparatus according to claim 12, further comprising a lock member, which secures the operation member in the second operation position, when the operation member is moved to the second operation position.

14. The electronic apparatus according to claim 12, further comprising a cooperation mechanism, which transmits movement of the operation member to the engaging member.

15. An electronic apparatus comprising:
a main unit;
a display unit distinct from the main unit;
a hinge mechanism having first and second shafts, the first shaft connecting the display unit to the main unit such that the display unit is rotatable between a closed position where the display unit overlies the main unit, and an open position where the display unit is raised up from the main unit, and the second shaft being perpendicular to the first shaft and connecting the display unit to the main unit so as to be rotatable in a circumferential direction of the second shaft;
a braking mechanism mounted in the main unit and having a rotary body, which receives braking force that limits rotation of the display unit between the closed position and the open position the rotary body having a recess; and
an engagement member, which is mounted in the display unit and movable between an engagement position where the engagement member is engaged with the recess of the rotary body and an engagement release position where the engagement is removed from the recess of the rotary body, wherein the rotary body is coupled with the display unit by engagement of the engagement member with the recess.

16. The electronic apparatus according to claim 15, wherein the first shaft of the hinge mechanism and the rotary body of the braking mechanism are arranged coaxially with each other, and the rotary body and the display unit are integrally rotated in a circumferential direction of the first shaft by engagement of the engaging member with the recess.

17. The electronic apparatus according to claim 15, further comprising:
an operation member, which is mounted in the display unit and movable between a first operation position to move the engaging member to the engagement position and a second operation position to move the engaging member to the engagement release position; and
a securing member, which secures the operation member in the second operation position, when the operation member is moved to the second operation position.

18. The electronic apparatus according to claim 17, further comprising a cooperation mechanism, which transmits movement of the operation member to the engaging member.

* * * * *